United States Patent
Yoshida et al.

(10) Patent No.: US 7,594,206 B2
(45) Date of Patent: Sep. 22, 2009

(54) FAULT DETECTING METHOD AND LAYOUT METHOD FOR SEMICONDUCTOR INTEGRATED CIRCUIT

(75) Inventors: Takaki Yoshida, Ibaraki (JP); Reisuke Shimoda, Mishima-gun (JP)

(73) Assignee: Panasonic Corporation, Osaka (JP)

( * ) Notice: Subject to any disclaimer, the term of this patent is extended or adjusted under 35 U.S.C. 154(b) by 472 days.

(21) Appl. No.: 11/409,033

(22) Filed: Apr. 24, 2006

(65) Prior Publication Data

US 2006/0236184 A1 Oct. 19, 2006

Related U.S. Application Data

(62) Division of application No. 09/697,305, filed on Oct. 27, 2000, now Pat. No. 7,065,690.

(30) Foreign Application Priority Data

Oct. 29, 1999 (JP) .................................. 11-307872

(51) Int. Cl.
  *G06F 17/50* (2006.01)
  *G06F 11/22* (2006.01)
  *G01R 31/26* (2006.01)
  *G01R 31/02* (2006.01)
  *G01R 31/28* (2006.01)

(52) U.S. Cl. ..................... 716/4; 716/2; 716/8; 716/12; 716/21; 703/14; 714/25; 714/33; 714/37; 714/741; 702/59; 324/527; 324/537

(58) Field of Classification Search ............. 716/4, 716/2, 8, 12, 21; 703/14; 714/25, 33, 37, 714/741; 702/59; 324/527, 537
See application file for complete search history.

(56) References Cited

U.S. PATENT DOCUMENTS

| 4,204,633 A | 5/1980 | Goel .......................... 714/738 |
| 4,769,817 A | 9/1988 | Krohn et al. .................. 371/23 |

(Continued)

FOREIGN PATENT DOCUMENTS

JP 61-175737 8/1986

(Continued)

OTHER PUBLICATIONS

Gahmen et al., "An Efficient Dynamic Parallel Approach to Automatic Test Pattern Generation", Proceedings of Seventh Great Lakes Symposium on VLSI, Mar. 13-15, 1997, pp. 112-117.*

(Continued)

*Primary Examiner*—Phallaka Kik
(74) *Attorney, Agent, or Firm*—Steptoe & Johnson LLP

(57) ABSTRACT

The present invention provides a fault detecting method and a layout method for a semiconductor integrated circuit. The fault detecting method performs detection for faults in a semiconductor integrated circuit using a fault list corresponding to information on sites in the semiconductor integrated circuit where a fault is likely to occur or information required to reduce such faults. In addition, the fault detecting method and the layout method perform ordering of faults with their likelihood and weighting of the faults, taking into consideration physical information on a mask pattern within a chip or records of actual use of cells or functional blocks.

10 Claims, 50 Drawing Sheets

U.S. PATENT DOCUMENTS

| | | | |
|---|---|---|---|
| 5,257,268 A | 10/1993 | Agrawal et al. | 714/738 |
| 5,325,309 A | 6/1994 | Halaviati et al. | 364/488 |
| 5,414,716 A | 5/1995 | Bershteyn | 714/738 |
| 5,544,308 A | 8/1996 | Giordano et al. | 714/26 |
| 5,581,475 A | 12/1996 | Majors | 364/491 |
| 5,587,930 A | 12/1996 | Hori et al. | 702/185 |
| 5,640,403 A | 6/1997 | Ishiyama et al. | 371/26 |
| 5,663,967 A | 9/1997 | Lindberg et al. | 371/26 |
| 5,691,990 A * | 11/1997 | Kapur et al. | 714/726 |
| 5,737,340 A | 4/1998 | Tamarapalli et al. | 714/733 |
| 5,825,191 A | 10/1998 | Nijima et al. | 324/751 |
| 6,044,208 A | 3/2000 | Papadopoulou et al. | 395/500 |
| 6,066,179 A | 5/2000 | Allan | 716/4 |
| 6,067,651 A | 5/2000 | Rohrbaugh et al. | 714/738 |
| 6,223,316 B1 * | 4/2001 | Bommu et al. | 714/738 |
| 6,618,830 B1 | 9/2003 | Balachandran | 714/737 |
| 7,441,168 B2 * | 10/2008 | Yoshida et al. | 714/724 |

FOREIGN PATENT DOCUMENTS

| | | | |
|---|---|---|---|
| JP | 01-235872 | | 9/1989 |
| JP | 04344540 A | * | 12/1992 |
| JP | 07-098365 | | 4/1995 |
| JP | 09-080121 | | 3/1997 |
| JP | 09-264938 | | 10/1997 |
| JP | 11-025147 | | 1/1999 |
| JP | 11-087519 | | 3/1999 |
| JP | 11119823 A | * | 4/1999 |
| JP | 11-258313 | | 9/1999 |
| JP | 11-265980 | | 9/1999 |

OTHER PUBLICATIONS

Gollakota et al., "Fault Grading the Intel 80486", Proceedings of International Test Conference, Sep. 10-14, 1990, pp. 758-761.*

Hong et al., "An FPGA-based Hardware Emulator for Fast Fault Emulation", IEEE 39th Midwest Symposium on Circuits and Systems, vol. 1, Aug. 18-21, 1996, pp. 345-348.*

Jou et al., "Efficient Diagnostic Fault Simulation for Sequential Circuits", Proceedings of the Third Asian Test Symposium, Nov. 15-17, 1994, pp. 94-99.*

Ruiz, G., Mitchell, J.; Buron, A.; Switch-level fault detection and diagnosis environment for MOS digital circuits using spectral techniques; IEE Proceedings E [see also Computers and Digital Techniques, IEE Proceedings] Computers and Digital Techniques, pp. 293-307, Jul. 1992.

Mahlstedt, U.; Alt, J.; Hollenbeck, I.; Deterministic test generation for non-classical faults on the gate level; Proceedings of the Fourth Asian Test Symposium, Nov. 23-24, 1995, pp. 244-251.

Smith, D.T.; Johnson, B.W.; Profeta, J.A., III; System dependability evaluation via a fault list generation algoritth; IEEE Transactions on Computers, vol. 45, Issue 8, Aug. 1996, pp. 974-979.

Defect-Based Test: A Key Enabler for Successful Migration to Structural Test, Intel Technology Journal Q1.'99, pp. 1-14.

"Improved Method for Weighted Random Pattern Weight Generation", IBM Technical Disclosure Bulletin, May 1992, US, NN9205250.

* cited by examiner

FIG. 5

| TARGET FAULT |
|---|
| ONE FAULT AT POINT A |
| ZERO FAULT AT POINT A |
| ONE FAULT AT POINT B |
| ZERO FAULT AT POINT B |
| ONE FAULT AT POINT C |
| ZERO FAULT AT POINT C |
| . . . . . . . . . |
| ONE FAULT AT POINT N |
| ZERO FAULT AT POINT N |
| ONE FAULT AT POINT O |
| ZERO FAULT AT POINT O |

FIG. 6

| TARGET FAULT | LIKELIHOOD OF FAULT |
|---|---|
| ONE FAULT AT POINT H | LIKELY TO OCCUR |
| ONE FAULT AT POINT I | ↑ |
| ZERO FAULT AT POINT F | |
| ONE FAULT AT POINT G | |
| ONE FAULT AT POINT M | |
| ONE FAULT AT POINT O | |
| . . . . . . . . . | ↓ |
| ZERO FAULT AT POINT K | |
| ONE FAULT AT POINT L | UNLIKELY TO OCCUR |

FIG. 15

| CELL/BLOCK NAME | MASK DENSITY |
|---|---|
| BLOCK 1 | 90% |
| BLOCK 2 | 85% |
| BLOCK 3 | 91% |
| . | . |
| . | . |
| . | . |
| . | . |
| . | . |
| . | . |

FIG. 17

| CELL/FUNCTIONAL BLOCK NAME | NUMBER OF PAST OPERATIONS | NUMBER OF PAST DEFECTS | RELIABILITY TEST STATUS | NUMBER OF SUCCESSFUL PROCESSES |
|---|---|---|---|---|
| BLOCK A | 1500 | 0 | ◎ | 100 |
| BLOCK B | 500 | 2 | ◎ | 100 |
| BLOCK C | 800 | 1 | ○ | 100 |
| BLOCK D | 20 | 3 | △ | 5 |
| BLOCK E | 1000 | 0 | ◎ | 100 |
| BLOCK F | 1201 | 0 | ◎ | 100 |
| ... | ... | ... | ... | ... |

FIG. 20

| TARGET FAULT | CONVENTIONAL FAULT WEIGHTING | WEIGHTING BASED ON FAULT LIKELIHOOD |
|---|---|---|
| ONE FAULT AT POINT A | 1 | 0.2 |
| ZERO FAULT AT POINT A | 1 | 0.2 |
| ONE FAULT AT POINT B | 1 | 1.8 |
| ZERO FAULT AT POINT B | 1 | 1.6 |
| ONE FAULT AT POINT C | 1 | 0.5 |
| ZERO FAULT AT POINT C | 1 | 0.5 |
| . . . . . . . . . . | . | . |
| . . . . . . . . . . | . | . |
| ONE FAULT AT POINT T | 1 | 1.0 |
| ZERO FAULT AT POINT T | 1 | 1.0 |

FIG. 22

| TARGET FAULT | WEIGHTING |
|---|---|
| ONE FAULT AT POINT H | 1.95 |
| ONE FAULT AT POINT I | 1.90 |
| ZERO FAULT AT POINT F | 1.85 |
| ONE FAULT AT POINT G | 1.80 |
| . . . . . . . . . . | . . . . . |
| ZERO FAULT AT POINT S | 1.05 |
| ZERO FAULT AT POINT T | 1.00 |
| ZERO FAULT AT POINT B | 0.95 |
| . . . . . . . . . . | . . . . . |
| ZERO FAULT AT POINT K | 0.10 |
| ONE FAULT AT POINT L | 0.05 |

FIG. 23

| TARGET FAULT | WEIGHTING | DETECTED/ UNDERECTED DETERMINATION |
|---|---|---|
| ONE FAULT AT POINT H | 1.95 | DETECTED |
| ONE FAULT AT POINT I | 1.90 | DETECTED |
| ZERO FAULT AT POINT F | 1.85 | UNDETECTED |
| ONE FAULT AT POINT G | 1.80 | DETECTED |
| . . . . . . . . . . . . | . . . | . . . . . |
| ZERO FAULT AT POINT S | 1.05 | UNDETECTED |
| ZERO FAULT AT POINT T | 1.00 | DETECTED |
| ZERO FAULT AT POINT B | 0.95 | UNDETECTED |
| . . . . . . . . . . . . | . . . | . . . . . |
| ZERO FAULT AT POINT K | 0.10 | UNDETECTED |
| ONE FAULT AT POINT L | 0.05 | DETECTED |

FIG. 25

| TARGET FAULT | CELL/ FUNCTIONAL BLOCK | MASK DENSITY | WEIGHTING |
|---|---|---|---|
|  | 1 CHIP | 1.0 |  |
| A | BLOCK A | 0.9 | 0.9 |
| B | BLOCK B | 0.9 | 0.9 |
| C | BLOCK C | 0.95 | 0.95 |
| D | BLOCK D | 0.95 | 0.95 |
| E | BLOCK E | 0.95 | 0.95 |
| F | BLOCK F | 0.8 | 0.8 |

FIG. 29

| TARGET FAULT | WEIGHTING | ACCUMULATED POSSIBLE FAULT COVERAGE |
|---|---|---|
| ONE FAULT AT POINT H | 1.95 | 5.0% |
| ONE FAULT AT POINT I | 1.90 | 9.9% |
| ZERO FAULT AT POINT F | 1.85 | 14.6% |
| ONE FAULT AT POINT G | 1.80 | 19.2% |
| . . . . . . . . . . . | . . . | . . . . . |
| ZERO FAULT AT POINT K | 0.10 | 99.9% |
| ONE FAULT AT POINT L | 0.05 | 100% |

FIG. 35

| TIME | TEST PATTERN | | | | | |
|---|---|---|---|---|---|---|
| | INPUT | | | | EXPECTED VALUE | |
| | P1 | P2 | P3 | P4 | P5 | P6 |
| 1 | 0 | 0 | 1 | 0 | H | H |
| 2 | 1 | 0 | 1 | 1 | L | H |
| 3 | 0 | 1 | 1 | 0 | H | L |
| 4 | 1 | 1 | 0 | 1 | L | H |
| 5 | 1 | 1 | 1 | 1 | H | H |

FIG. 36

| TIME | TEST PATTERN | | | | | |
|------|---|---|---|---|---|---|
| | INPUT | | | | EXPECTED VALUE | |
| | P1 | P2 | P3 | P4 | P5 | P6 |
| 1 | 0 | 0 | 1 | 0 | (L) | H |
| 2 | 1 | 0 | 1 | 1 | L | H |
| 3 | 0 | 1 | 1 | 0 | H | L |
| 4 | 1 | 1 | 0 | 1 | L | H |
| 5 | 1 | 1 | 1 | 1 | H | H |

FIG. 37

| TIME | TEST PATTERN | | | | | |
|---|---|---|---|---|---|---|
| | INPUT | | | | EXPECTED VALUE | |
| | P1 | P2 | P3 | P4 | P5 | P6 |
| 1 | 0 | 0 | 1 | 0 | (L) | H |
| 2 | 1 | 0 | 1 | 1 | L | H |
| 3 | 0 | 1 | 1 | 0 | H | (H) |
| 4 | 1 | 1 | 0 | 1 | L | H |
| 5 | 1 | 1 | 1 | 1 | H | H |

FIG. 38

| TIME | TEST PATTERN | | | | | |
|---|---|---|---|---|---|---|
| | INPUT | | | | EXPECTED VALUE | |
| | P1 | P2 | P3 | P4 | P5 | P6 |
| 1 | 0 | 0 | 1 | 0 | H | H |
| 2 | 1 | 0 | 1 | 1 | Ⓗ | H |
| 3 | 0 | 1 | 1 | 0 | H | Ⓗ |
| 4 | 1 | 1 | 0 | 1 | Ⓗ | H |
| 5 | 1 | 1 | 1 | 1 | H | H |

FIG. 42

| PARAMETER | LIKELY FAULT |
|:---:|:---:|
| A&B | X FAULT |
| A&C | Y FAULT |
| B&C | Z FAULT |
| A&!B | $\alpha$ FAULT |
| A&!C | $\beta$ FAULT |
| . . . . . . | . . . . . |

FAULT DETECTING METHOD AND LAYOUT METHOD FOR SEMICONDUCTOR INTEGRATED CIRCUIT

This application is a divisional of application Ser. No. 09/697,305 filed Oct. 27, 2000, now allowed and issued as U.S. Pat. No. 7,065,690.

FIELD OF THE INVENTION

The present invention relates to a fault detecting method and a layout method for a semiconductor integrated circuit, and in particular, to a fault detecting method and a layout method for a semiconductor integrated circuit which can efficiently and accurately perform detection for faults in a semiconductor integrated circuit and lay it out, respectively.

BACKGROUND OF THE INVENTION

In a conventional layout process for a mask pattern for a semiconductor integrated circuit, a layout device automatically generates a mask layout diagram indicating the physical layout of a mask pattern or wiring for an integrated circuit based on a logically verified circuit netlist. Since a circuit diagram has no practical physical information, the physical positional relationship in the mask pattern are given only through the layout process. In most cases, the physical positions of the mask pattern in the layout are based on timing information on logical operations of the integrated circuit.

If, for example, fine foreign matter adheres to a mask during an integrated circuit manufacturing process, a defect such as a pattern bridge occurs in that portion to which the foreign matter adheres. Such a defect is generally detected by using predetermined test patterns in an integrated circuit detecting step to examine input and output signals. An automatic test pattern generator (ATPG) is also known which automatically generates such test patterns based on information such as a circuit diagram.

In an advanced integrated circuit, however, the number of test patterns executed is limited due to a limitation on an detection time associated with costs. Thus, it is important to promptly and efficiently detect a defect (hereafter referred to as a "fault") in the integrated circuit. Accordingly, it is necessary to determine the probability of detecting faults in the integrated circuit using certain test patterns, that is, to evaluate a fault coverage. The evaluation of the fault coverage is referred to as "fault detection" herein. The term "fault detection" herein is sometimes used to express its original meaning, that is, detection for faults.

With a conventional fault detection, the fault coverage is output using a circuit netlist, or fault list and test patterns. Specifically, the fault detecting means (ATPG) allows a fault state to be artificially created in an interacted circuit, which is then processed by a tester (or a fault detector) to determine whether or not that fault is normally detected (fault simulation).

The fault list is not only loaded but may also be output as a detection result. The fault detecting means (ATPG) uses the circuit netlist or the fault list to automatically generate test patterns, and may also output the fault coverage.

Due to a recent increase in the scale of integrated circuits, an enormous amount of test patterns and a large amount of processing time for fault simulation for the test patterns are required to obtain a high fault coverage. An enormous amount of processing time is also required for the ATPG and a large amount of test patterns are automatically generated by the ATPG. On the other hand, a required fault coverage is increasing in order to improve the reliability of the integrated circuit.

When a phenomenon that may cause a fault, for example, adhesion of foreign matter to a mask occurs in a physical area on a chip, this may lead to a fault if the foreign matter sticks to a portion where a mask pattern is present. There are portions in the chip where no mask pattern is present, and no fault occurs even if the foreign matter adheres to these portions.

Typically, the mask pattern is not uniformly present on the chip; the mask pattern is dense in some areas, while it is coarse in the other areas. Consequently, if a phenomenon that may cause a fault occurs substantially uniformly on the chip, the probability of an actual fault occurring is not uniform on the chip, but the fault occurrence rate is higher in a dense portion in the mask pattern than in a coarse portion in the mask pattern.

On the other hand, when, for example, a mask portion for a normal signal line is close to a mask portion for a power line, the integrated circuit is likely to malfunction due to a possible noise from a power supply. If signal lines are close to each other, the integrated circuit is also likely to malfunction because a signal of a lower intensity is affected by a signal of a higher intensity.

Thus, the probability of an actual fault occurring varies depending on mask conditions, that is, the layout, wiring, and the type of the mask.

Furthermore, the possibility of a fault occurring increases if a new process, a newly developed cell, or a cell or functional block the reliability of which has not been proved is used.

The conventional fault detection uses only the circuit netlist and test patterns and does not take the circuit layout or the records of use of cells or functional blocks into consideration. That is, the fault simulation is carried out by assuming the possibility of an actual fault occurring for each fault to be subjected to detection to be constant, so that the conventional fault coverage may not be accurate enough to be an actual index of the fault occurrence rate. In addition, the conventional fault detection is inefficient because it does not subject actually likely faults to the fault detection or the ATPG before less likely faults.

Additionally, due to the ever increasing scale and decreasing size of recent integrated circuits, there are expected to be new faults that cannot be expressed by a conventional single stuck-at fault model. That is, the relationship between a defect level in the market and the fault coverage may not be expressed by a simple equation such as that described later. A new measure for the fault coverage is thus required which takes actual faults occurring into account.

Furthermore, the conventional layout method does not take the likelihood of faults into consideration and takes no mask layout measures for preventing faults.

SUMMARY OF THE INVENTION

It is thus an object of the present invention to use physical information on a mask pattern in a chip of a semiconductor integrated circuit and the records of use of cells or functional blocks to enable accurate and efficient fault detections and layouts based on actual faults, thereby reducing faults such as initial defects.

A fault detecting method according to the present invention perform detection for faults in a semiconductor integrated circuit using a fault list corresponding to information on sites of the semiconductor integrated circuit where a fault is likely to occur or information required to reduce faults. A fault detecting method and a layout method according to the present invention orders faults with their likelihood and weights them based on this ordering, taking into consideration physical information on a mask pattern within a chip of the semiconductor integrated circuit and the records of use of cells or functional blocks.

The present invention thus enables accurate and efficient fault detections and layouts based on actual faults to reduce faults in the semiconductor integrated circuit such as initial defects.

Repeatedly speaking, the present invention uses the fault list corresponding to information on sites of the semiconductor integrated circuit where a fault is likely to occur or information required to reduce faults, to perform detection for faults in the semiconductor integrated circuit or layout a mask or wiring for the semiconductor integrated circuit.

The present invention performs detection for faults in the semiconductor integrated circuit to create a fault list containing information on sites of the semiconductor integrated circuit where a fault is likely to occur or information required to reduce faults, and use this list to perform detection for faults in the semiconductor integrated circuit or layout a mask or wiring for the semiconductor integrated circuit.

The present invention omits faults that are difficult to detect in fault detection and uses the remaining part of the fault list to perform detection for faults in the semiconductor integrated circuit or layout a mask or wiring for the semiconductor integrated circuit.

The present invention provides the fault list with data on the likelihood of each fault.

The present invention uses a fault list containing faults ordered with their likelihood to perform detection for faults in the semiconductor integrated circuit or layout a mask or wiring for the semiconductor integrated circuit.

The present invention weights faults with their likelihood to determine a fault coverage for a fault detection or for the layout of a mask or wiring for the semiconductor integrated circuit.

The present invention orders faults with their likelihood to weight them based on this ordering.

The present invention orders or weights faults with their likelihood based on mask information obtained from a layout device for laying out the semiconductor integrated circuit.

The present invention calculates the density of the mask pattern based on the mask information obtained from the layout device for laying out the semiconductor integrated circuit, to order or weight faults with their likelihood depending on this mask pattern density.

The present invention orders or weights faults with their likelihood using a database for reliability determined from the records of past use of cells or functional blocks of the semiconductor integrated circuit.

The present invention calculates a fault coverage that can be obtained when detecting each fault, to remove faults that are not required to achieve a specified fault coverage in the order of the unlikelihood of faults so that detection is performed for the remaining faults.

The present invention calculates a fault coverage while performing detection for each fault in accordance with the ordering and stops the processing once a specified fault coverage has been reached.

The present invention thus uses the fault list corresponding to information on sites of the semiconductor integrated circuit where a fault is likely to occur, to perform detection for faults in the semiconductor integrated circuit, and uses the physical information on the mask pattern in the chip of the semiconductor integrated circuit and the records of use of cells or functional blocks to order and weight the faults with their likelihood. As a result, accurate and efficient fault detections and layouts are enabled based on actual faults, thereby reducing faults in the semiconductor integrated circuit such as initial defects.

BRIEF DESCRIPTION OF THE DRAWINGS

FIG. 5 is a fault list corresponding to the logic circuit diagram in FIG. 4;

FIG. 6 is a fault list ordered based on the likelihood of faults in the logic circuit diagram in FIG. 4;

FIG. 15 is a chart illustrating a list of mask densities according to the sixth embodiment of the present invention;

FIG. 17 is a chart illustrating a use record database for cells or functional blocks according to a seventh embodiment of the present invention;

FIG. 20 is a chart illustrating the concept of weighting of faults according to an eighth embodiment of the present invention;

FIG. 22 is a chart showing a specific example of weighting of faults according to the ninth embodiment of the present invention;

FIG. 23 is a chart showing a specific example where determinations of whether or not faults have been detected are added to the weighting of the faults in FIG. 22;

FIG. 25 is a chart showing a specific example of a weighted fault list according to the tenth embodiment of the present invention;

FIG. 29 is a chart illustrating a fault list containing possible fault coverages according to a thirteenth embodiment of the present invention;

FIG. 35 is a view showing an example of a test pattern;

FIG. 36 is a chart showing an example of a fail log for the circuit in FIG. 34;

FIG. 37 is a chart showing another example of a fail log for the circuit in FIG. 34;

FIG. 38 is a chart showing yet another example of a fail log for the circuit in FIG. 34;

FIG. 42 is a chart showing an example of a fault table indicating likely faults according to the second example of a method for sorting out a suspected failing site according to the present invention;

DESCRIPTION OF THE PREFERRED EMBODIMENTS

Description of the Prior Art

Before explaining the embodiments of the present invention, the prior art will be described with reference to the drawings.

Figure 48:
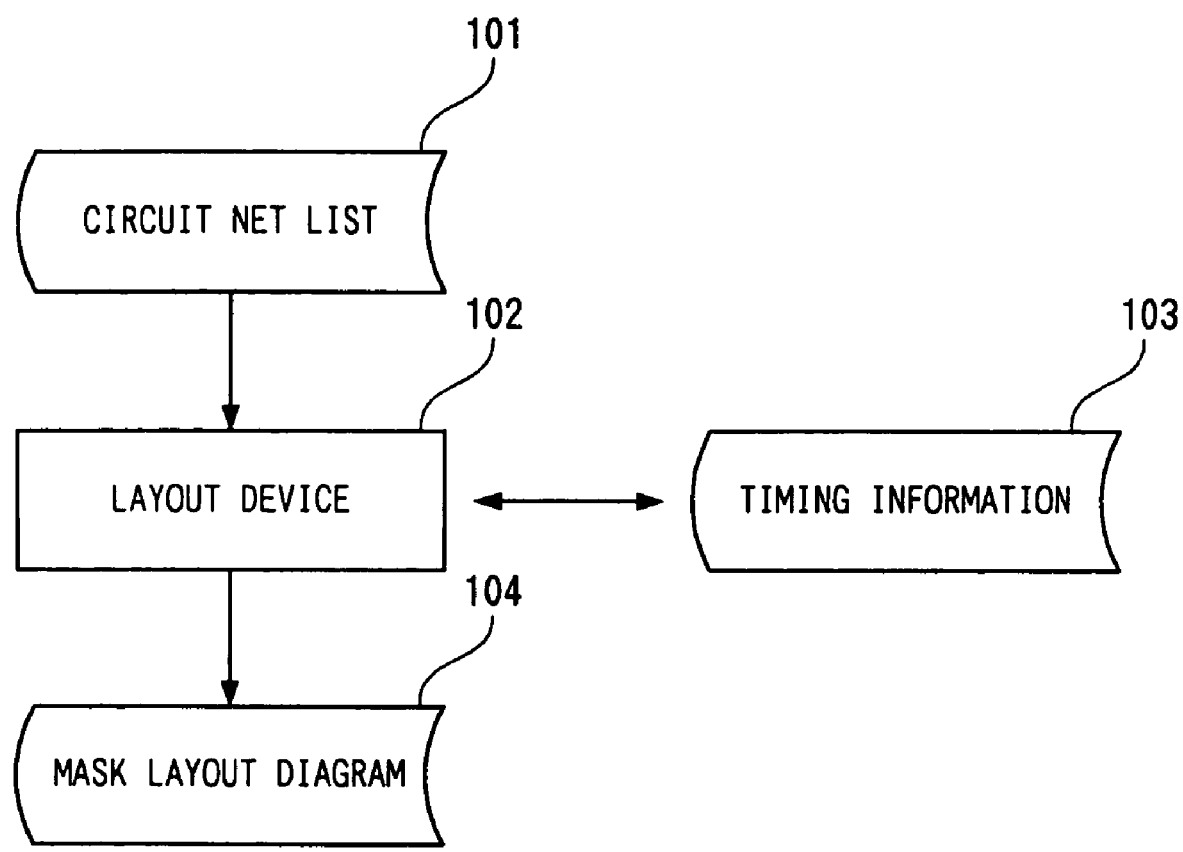
FIG. 48 is a diagram showing a conventional layout process for a mask pattern.

As shown in FIG. 48, a layout device 102 automatically generates a mask layout diagram 104 indicating the physical layout of a mask pattern or wiring for an integrated circuit, based on a circuit netlist 101 that has already been logically verified. Since the circuit diagram has no actual physical information, the physical positional relationship in the mask pattern is not given until a layout process is started. In most cases, the physical positional relationship in the mask pattern in the layout are based on timing information 103 on logic operations of the integrated circuit.

If, for example, fine foreign matter adheres to a mask in an integrated circuit manufacturing process, a defect such as a pattern bridge occurs in that portion to which the foreign matter adheres. Such a defect is generally detected by using predetermined test patterns in an integrated circuit detecting step to examine input and output signals. An automatic test pattern generator (ATPG) is also known which automatically generates such test patterns based on information such as a circuit diagram.

In an advanced integrated circuit, however, the number of test patterns executed is limited due to a limitation on an detection time associated with costs. Thus, it is important to promptly and efficiently detect a defect in the integrated circuit. Accordingly, it is necessary to determine the probability of detecting faults in the integrated circuit using certain test patterns, that is, to evaluate a fault coverage.

Figure 49:
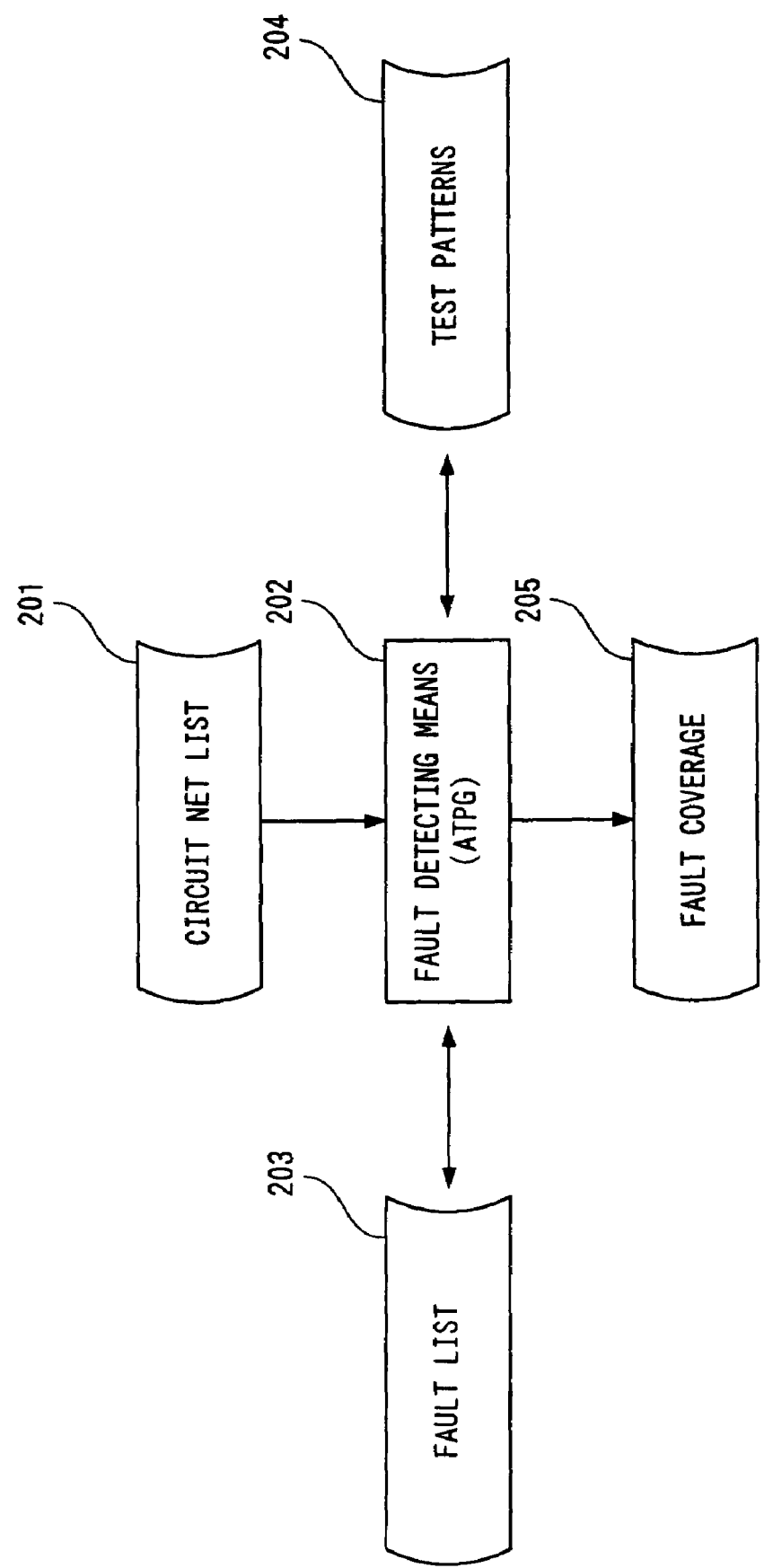
FIG. 49 is a flow chart showing a process procedure for a conventional fault detection.

FIG. 49 shows a flow chart of a conventional fault detection. The fault coverage is output using a circuit netlist 201, or fault list 203 and test patterns 204.

Specifically, a fault detecting means (ATPG) 202 allows a fault state to be artificially created in an integrated circuit, which is then processed by a tester (or a fault detector) to determine whether or not that fault is normally detected (fault simulation).

The fault list is not only loaded but may also be output as a detection result. The fault detecting means (ATPG) 202 uses the circuit netlist or the fault list 203 to automatically generate test patterns 204, and may also output a fault coverage 205.

Due to a recent increase in the scale of integrated circuits, an enormous amount of test patterns and a large amount of processing time for fault simulation for the test patterns are required to obtain a high fault coverage. An enormous amount of processing time is also required for the ATPG and a large amount of test patterns are automatically generated by the ATPG. On the other hand, a required fault coverage is increasing in order to improve the reliability of the integrated circuit.

On the other hand, a defect level in the market and the fault coverage are conventionally expressed by Equation (1), shown below, where U denotes the defect level in the market, K denotes the fault coverage, and Y denotes a yield.

$$U = 1 - Y^{(1-K)^2}$$

U: Defect level in the market
K: Fault coverage
Y: Yield

The fault coverage is based on a model for a single degenerative fault, that is, a 0 degenerative fault and a 1 degenerative fault. The 0 degenerative fault is assumed to be a fault in which a signal line is fixed to zero, for example, a case where the signal line is bridged over a mask for a VSS (ground) power supply. Many faults other than the bridge across a signal line and a power supply can be expressed by a similar model; all faults can conventionally be expressed by Equation (1).

When a phenomenon that may cause a fault, for example, adhesion of foreign matter to a mask occurs in a physical area on a chip, this may lead to a fault if the foreign matter sticks to a portion where a mask pattern is present. The chip has portions where no mask pattern is present, and no fault occurs if the foreign matter adheres to these portions.

Typically, the mask pattern is not uniformly present on the chip; the mask pattern is dense in some areas, while it is coarse in the other areas. Consequently, if a phenomenon that may cause a fault occurs substantially uniformly on the chip, the probability of an actual fault occurring is not uniform on the chip, but the fault occurrence rate is higher in dense portions in the mask pattern than in coarse portions in the mask pattern.

Figure 50:
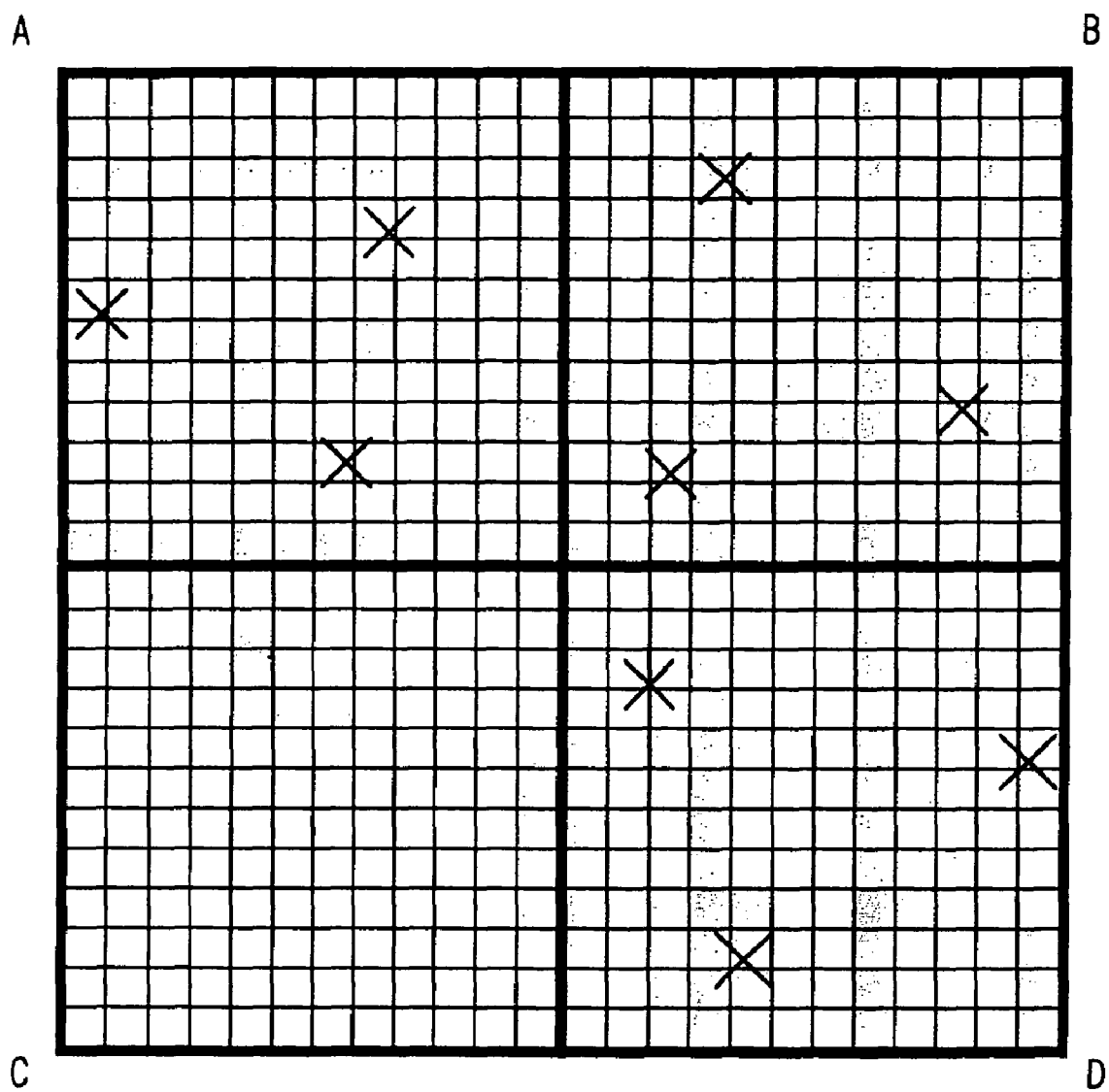
FIG. 50 is a schematic view showing an example of a distribution of a mask pattern for an integrated circuit.

It is assumed that a rectangular chip has portions with a mask pattern and portions without the mask pattern distributed thereon as shown in FIG. 50. In this figure, the mask pattern is present in the "portions with the mask pattern", which are shaded, while it is absent in the "portions without the mask pattern", which are not shaded. When the entire rectangular chip is divided vertically and laterally into four blocks A, B, C, and D, the density of the mask pattern in each block, that is, the ratio of the area occupied by the mask pattern to the entire area differs among the blocks. In FIG. 50, the density of the mask pattern is highest in a block B and lowers in the order of blocks D, A, and C. The crosses in the figure indicate sites that cause a fault, and portions with a low mask pattern density have a low fault occurrence rate despite a phenomenon that may cause a fault. On contrary, portions with a high mask pattern density have a high fault occurrence rate with the same phenomenon that may cause a fault. For example, in FIG. 50, due to its higher density than the block A, the block B has a higher rate at which a fault occurs actually when a phenomenon that may cause a fault is present.

On the other hand, when, for example, a mask for a normal signal line is close to a mask for a power line, the integrated circuit is likely to malfunction due to a possible noise from a power supply. If signal lines are close to each other, the integrated circuit is also likely to malfunction because a signal of a lower intensity is affected by a signal of a higher intensity.

Thus, the probability of an actual fault occurring varies depending on mask conditions, that is, the layout, wiring, and the type of the mask.

Furthermore, the possibility of a fault occurring increases if a new process, a newly developed cell, or a cell or functional block the reliability of which has not been proved is used.

The conventional fault detection uses only the circuit netlist and test patterns and does not take the circuit layout or the records of use of cells or functional blocks into consideration, as shown in FIGS. 48 and 49. That is, fault simulation is carried out by assuming the possibility of an actual fault occurring for each fault to be subjected to detection to be constant, so that the conventional fault coverage may not be accurate enough to be an actual index of the fault occurrence rate. In addition, the conventional fault detection is inefficient because it does not subject actually likely faults to the fault detection or the ATPG before less likely faults.

Additionally, due to the ever increasing scale and decreasing size of recent integrated circuits, there are expected to be new faults that cannot be expressed by the conventional single stuck-at fault model. That is, the relationship between the defect level in the market and the fault coverage may not be expressed by the above Equation (1). A new measure for the fault coverage is thus required which takes actual faults occurring into account.

Furthermore, the conventional layout method does not take the likelihood of faults into consideration and takes no mask layout measures for preventing faults.

Description of the Embodiments of the Invention

The embodiments of the present invention will be described below with reference to the drawings.

Figure 1:
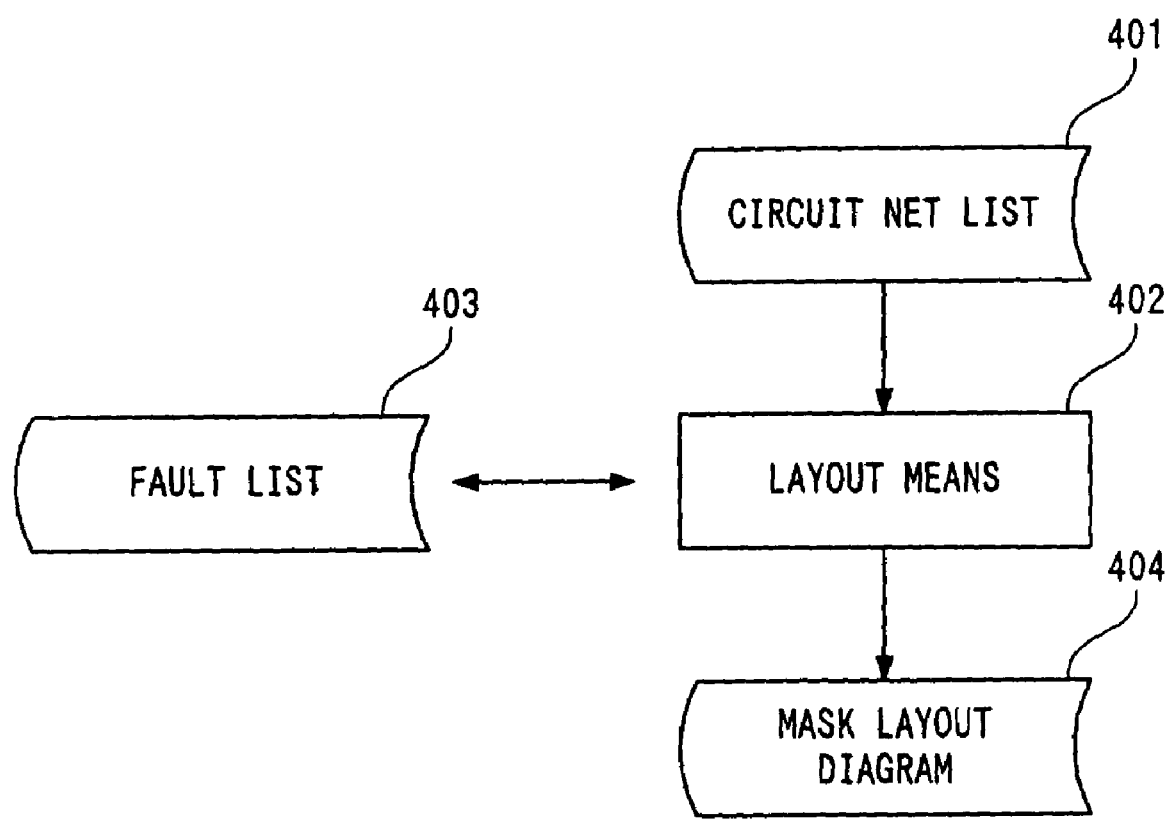
FIG. 1 is a flow chart showing a process procedure for a layout method for loading a fault list according to a first embodiment of the present invention.

FIG. 1 is a diagram useful in explaining a first embodiment. Faults occurring in the integrated circuit vary depending on mask conditions, that is, the layout, wiring, and the type of the mask. They also vary depending on the level of records of use of cells and functional blocks in use. The fault occurrence rate of sites where a fault is likely to occur can be lowered by modifying the layout of the mask or the wiring. When, for example, a mask for a normal signal line is close to a mask for a power line, the integrated circuit is likely to malfunction due to a possible noise from a power supply. In this case, the possibility of a fault occurring can be reduced by increasing the interval between the power line and the mask.

In the prior art, a layout means 402 simply automatically generates a mask layout diagram 404 indicating the physical layout of a mask pattern or wiring for an integrated circuit based on a circuit netlist 401. According to the first embodiment of the present invention, the layout means 402 loads a fault list 403 containing information on sites of the semiconductor integrated circuit where a fault is likely to occur or information required by the layout means 402 to reduce faults. The information on sites where a fault is likely to occur may be generated by the layout means 402. The fault list 403 contains information such as closeness between masks, proximity to a power mask, proximity to a signal mask for supplying a clock, many overlappings of a contact, and crossing of vertically adjacent signal lines. In this case, the mask is laid out, the fault list is then generated, and the layout means 402 take certain measures again to reduce faults. In addition, if, for example, the layout means 402 takes certain measures for a possible failing site that has been insufficiently detected for faults, this site is contained in fault list 403.

Figure 2:
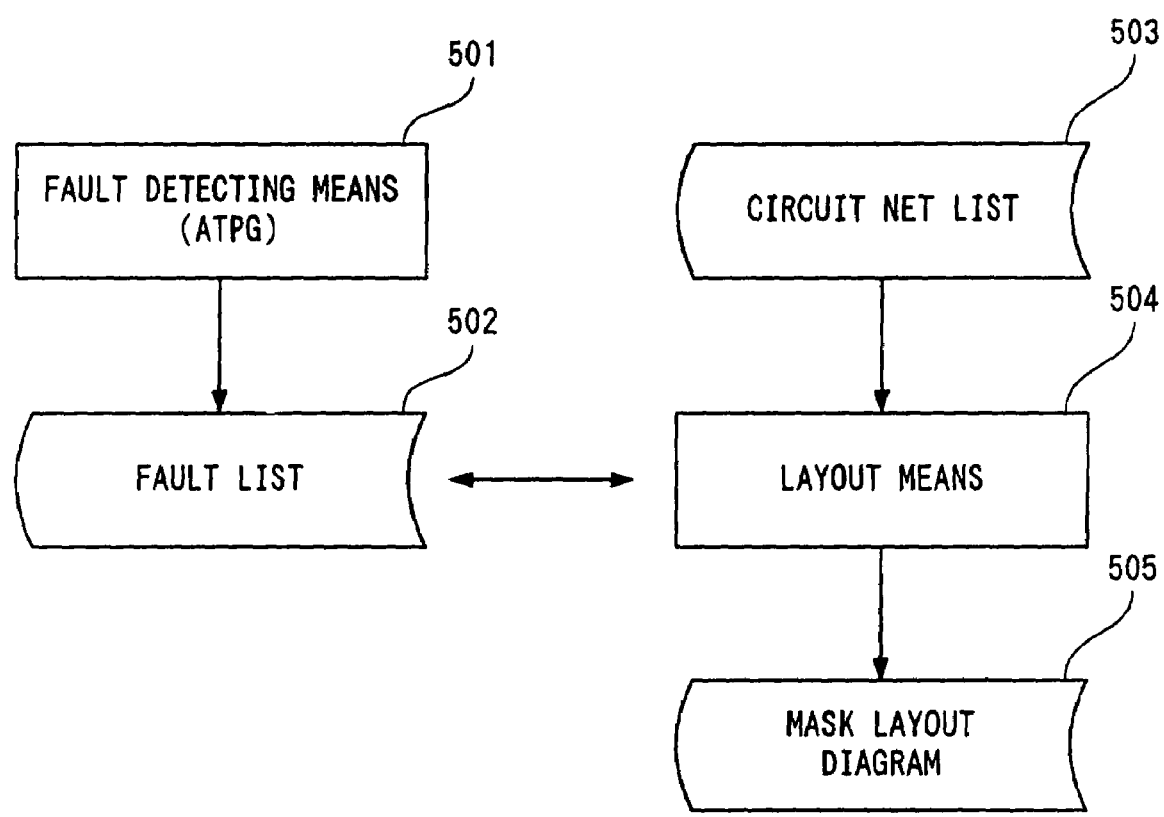
FIG. 2 is a flow chart showing a process procedure for a layout method for loading a fault list generated from fault detections according to a second embodiment of the present invention.

FIG. 2 is useful in explaining a second embodiment of the present invention. In this embodiment, faults are detected to create a fault list. If the result of the fault detection indicates that there are faults undetected, new test patterns must be added. Once the fault coverage has increased to a certain level, an enormous amount of time is required to create test patterns to further increase the fault coverage and the test patterns involve a large number of steps. Even the ATPG may generate very long test patterns or may not automatically generate such test patterns. That is, it is difficult to achieve a fault coverage of 100% and in most cases, undetected faults remain. These undetected faults are missed even if they are occurring actually because there are no test patterns that can detect them. Certain measures must be taken to minimize the occurrence of such faults.

Thus, according to the second embodiment, a fault list 502 output from a fault detecting means 501 is loaded in a layout means 504, which takes certain measures to reduce faults. This results in a mask layout diagram 505 for which the measures have been taken to reduce faults. In this manner, by using the mask layout to compensate for the insufficiency of the fault detection, defects are prevented from occurring and efficient fault detections are enabled.

The fault list 502 generated by the fault detecting means 501 contain undetected faults, faults that cannot necessarily be detected, and faults that a fault detecting device have given up processing due to a large amount of time required for the processing. Specifically, the fault list 502 defines physical coordinate data on a layout corresponding to these faults.

Figure 3:
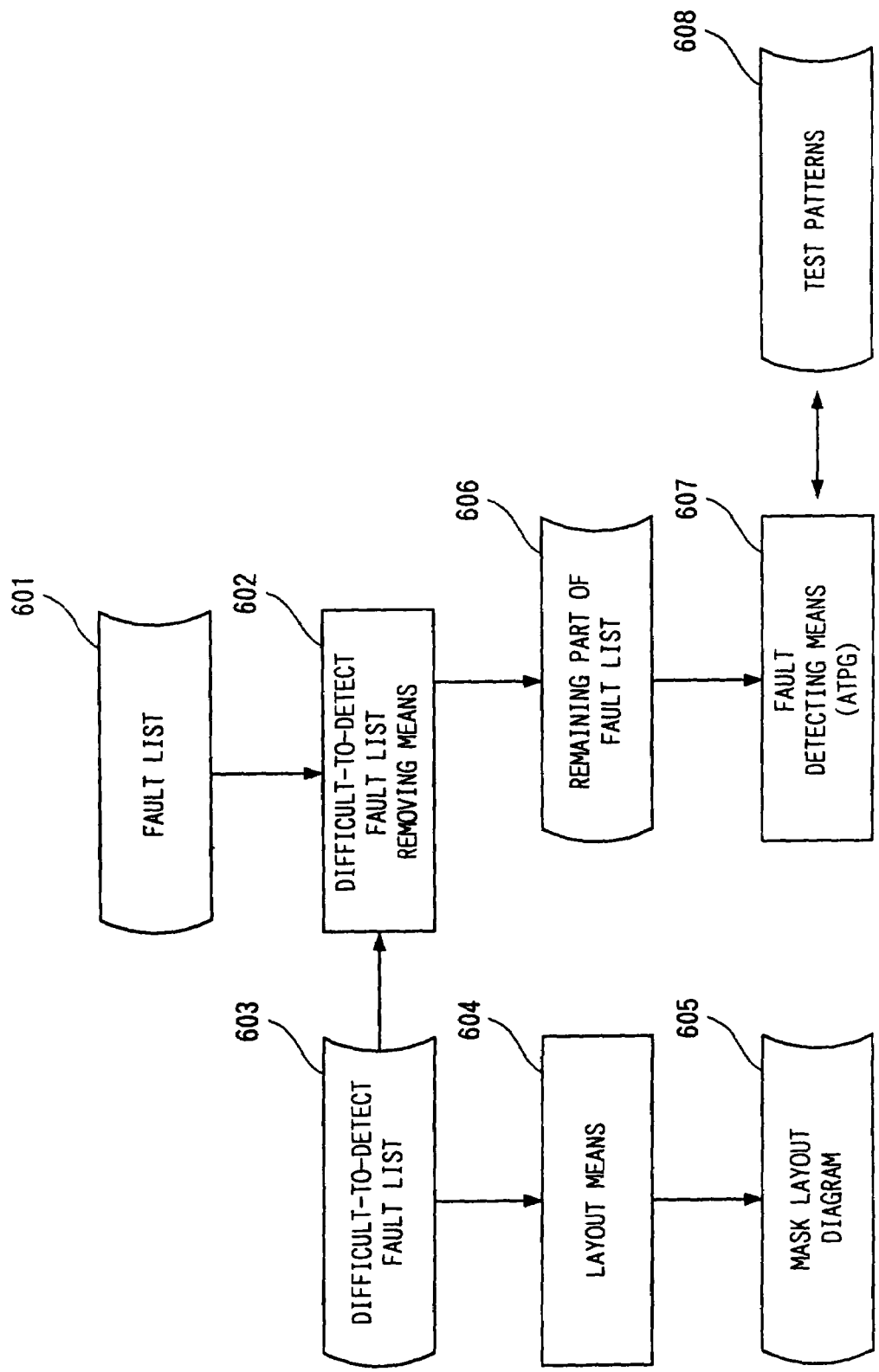
FIG. 3 is a flow chart showing a process procedure for a fault detecting method and a layout method according to a third embodiment of the present invention.

FIG. 3 is useful in explaining a third embodiment of the present invention. One of the reasons why a large amount of processing time is required for the fault detection is faults that are difficult to detect or cannot be detected.

In the fault detection, the detection time required to detect each fault is not uniform and varies significantly depending on how easily the fault is detected or the amount of events occurring during the detection. If a large amount of events occur during the detection, the load on hardware for a fault detector increases the amount of processing time. The fault detection is more effective when test patterns that are more likely to be detected or faults that can be more easily detected are processed before faults that require a larger amount of processing time due to events or when another measures are taken without processing the latter faults.

Some of the faults in the circuit that are difficult to detect are known. For example, flipflop pins on scan lines in a scan design, and system clock, set and reset pins, as well as control pins for tri-state cells for generating a signal unstable state may affect the circuit over a wide range if faults are set for these pins, thereby generating a larger number of events during the detection than if faults are set for normal detection sites.

The third embodiment of the present invention omits faults that may increase the processing time from the fault list before the other faults are subjected to the fault detection, and takes certain measures for reducing faults in a mask layout for omitted fault, thereby reducing the entire man hour and thus the defect level in the market.

Specifically, a difficult-to-detect fault list removing means 602 omits faults contained in a difficult-to-detect fault list 603 from a fault list 601 containing all faults to be subjected to detection, while effectively detection is performed for the other faults 606 (607). The names of cell instances, masks, or the like on the layout corresponding to the difficult-to-detect fault list 603 are then specified. Test patterns 608 are input to the fault detecting means 607 for normal fault detections, whereas the test patterns 608 can be automatically generated by the ATPG. For faults difficult to detect, a layout means 604 lays out the mask or wiring so as to reduce actual faults, to generate a mask layout diagram 605.

FIGS. 4 to 8 are useful in explaining a fourth embodiment of the present invention. With a netlist such as that shown in FIG. 4, a fault list containing faults to be subjected to detection is as shown in FIG. 5.

The fault detection is a process for detecting actual defects. The current fault detection is based on a circuit netlist to use a uniform likelihood for all faults to be subjected to detection. The likelihood of a fault, however, is actually not uniform but vary depending on physical factors of the mask or the like. Thus, to detect and deduction defects, which are an original objective, during a fault detection, faults that are likely to occur actually must be preferentially processed. Additionally, the ATPG must efficiently automatically generate patterns for detecting faults that are likely to occur actually.

Figure 4:
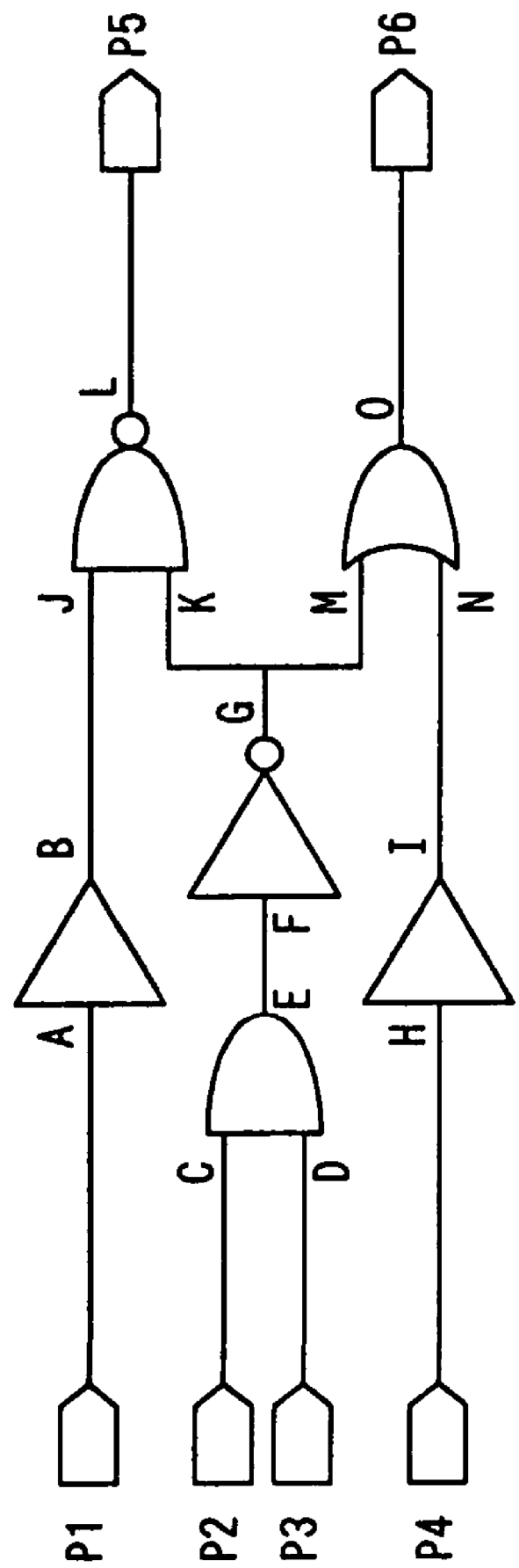
FIG. 4 is a logic circuit diagram useful in explaining a fault detecting method and a layout method according to a fourth embodiment of the present invention.
Figure 7:
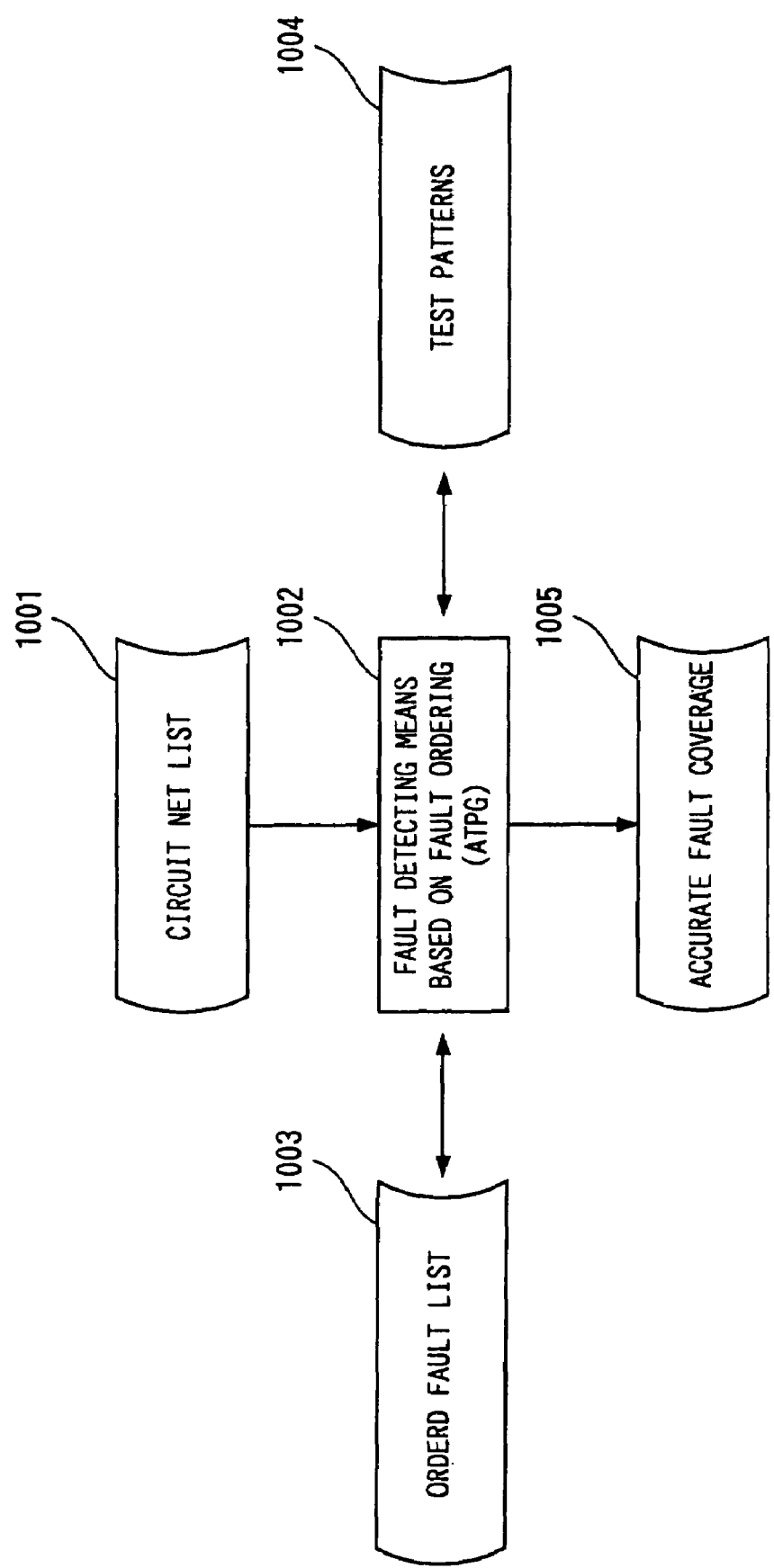
FIG. 7 is a flow chart showing a process procedure for a fault detecting method according to a fourth embodiment of the present invention.

Accordingly, in the fourth embodiment, a fault list ordered with the likelihood of faults as shown in FIG. 6 is loaded in the fault detecting means so that the circuit for example, in FIG. 4 can be effectively detected or detected by the ATPG for faults. Specifically, as shown in FIG. 7, an ordered fault list 1003 is loaded in a fault detecting means 1002 so that detection can be efficiently done for faults to output an accurate fault coverage 1005. With the ATPG, a fault 1003 ordered based on a circuit netlist 1001 is used to generate efficient test patterns 1004 while outputting the accurate fault coverage 1005.

Figure 8:
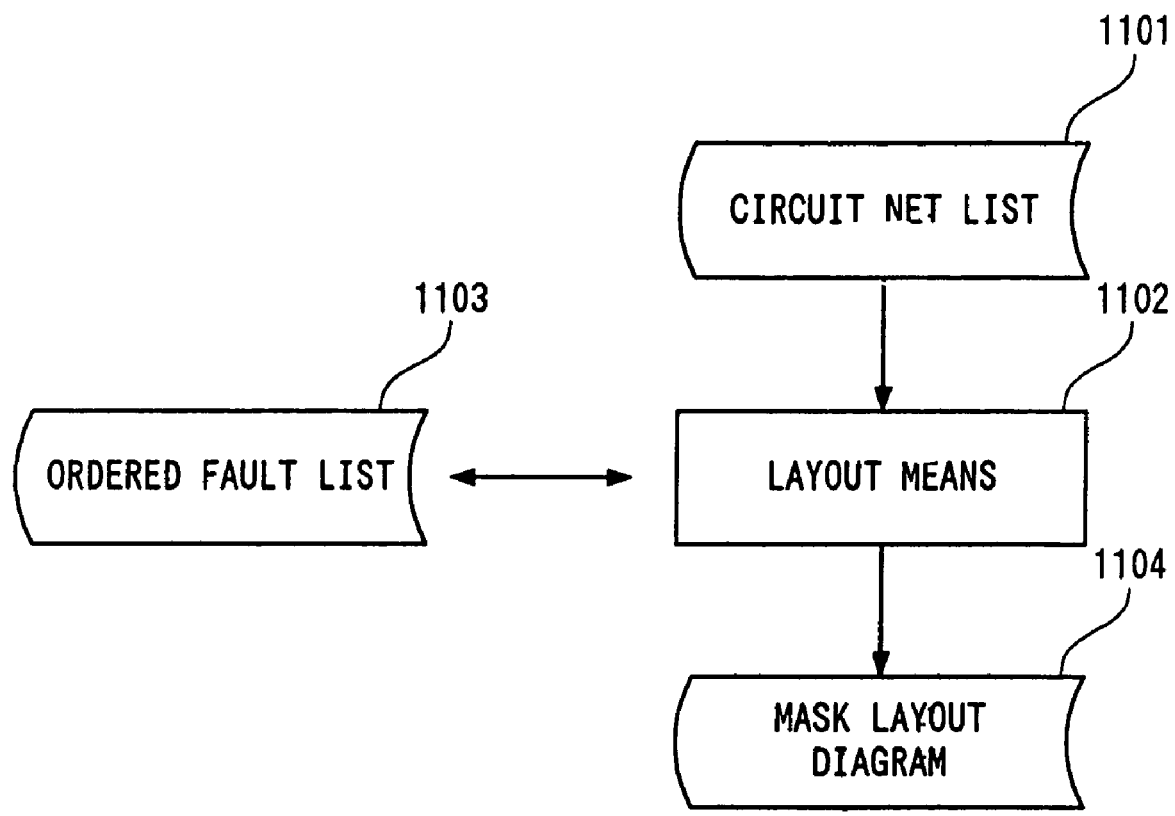
FIG. 8 is a flow chart showing a process procedure for a layout method according to the fourth embodiment of the present invention.

On the other hand, the likelihood of defects can be reduced for sites where a fault is likely to occur by appropriately laying out the mask the wiring. In the fourth embodiment, an ordered fault list is loaded not only in the fault detecting means but also in the layout means to reduce the likelihood of defects, as shown in FIG. 8. Specifically, an ordered fault list 1103 is loaded in the layout means 1102, and the mask and wiring are laid out so as to diminish the likelihood of defects to generate a mask layout diagram 1104. Reference numeral 1101 denotes a circuit netlist. An ordering criteria may be loaded in the layout means 1102 so that the ordered fault list 1103 can be generated from an already laid-out mask based on this criteria.

Figure 9:
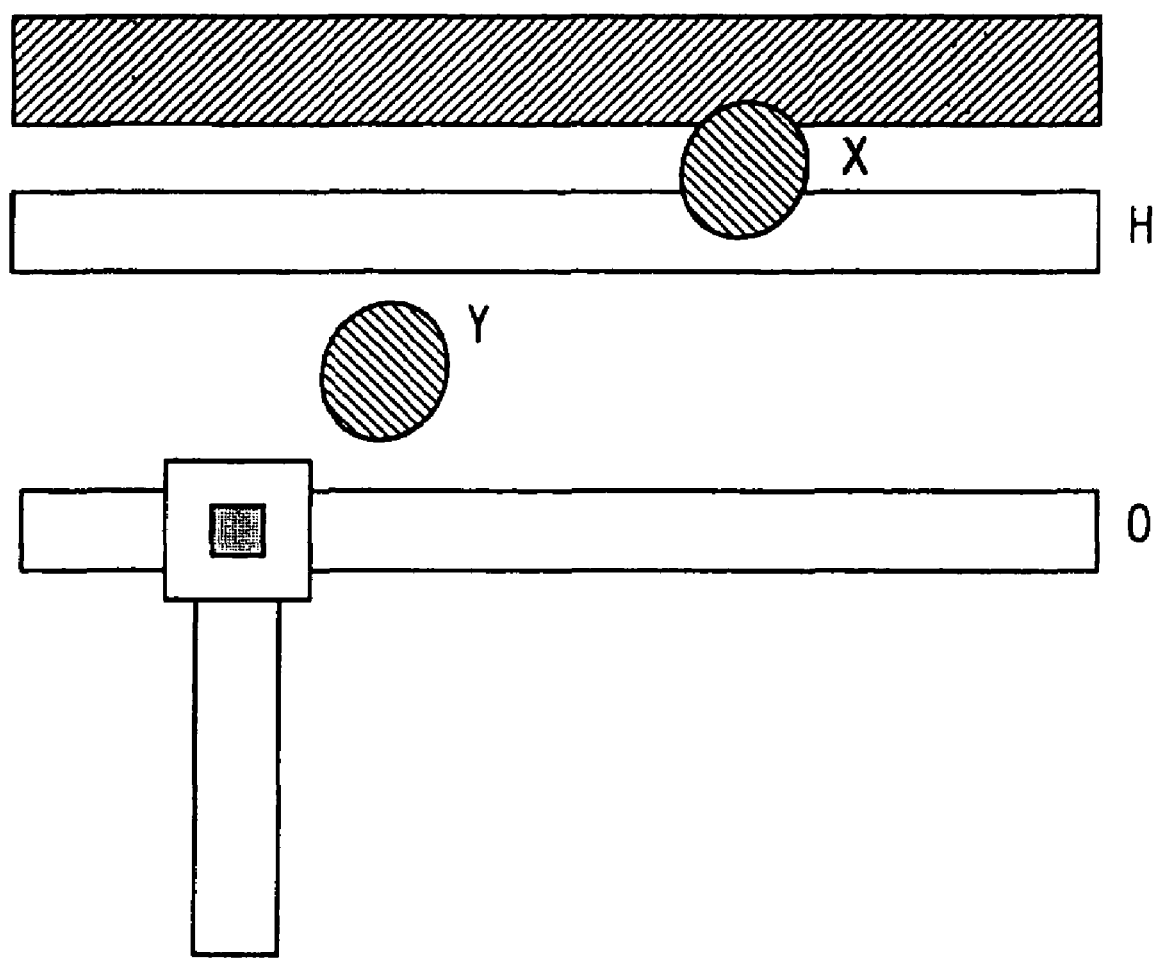
FIG. 9 is a view showing main portions of a fifth embodiment of the present invention in which the logic circuit diagram in FIG. 4 is replaced with a mask layout diagram.

FIGS. 9 to 13 show a fifth embodiment of the present invention. FIG. 9 is assumed to show part of a mask layout diagram that has been replaced for the circuit diagram shown in FIG. 4. The shaded portion in FIG. 9 shows a mask constituting a power supply. Fault sites H and O in FIG. 4 correspond to masks H and O in FIG. 9. In this case, H is close to the power mask. With a fine foreign matter X, H is more likely to undergo a short circuit than O. H is also likely to be affected by noise from the power mask. That is, H has a higher possibility of faults than O. The difference in the possibility of faults results from the difference in the layout of the mask the wiring between the two failing sites.

Figure 10:
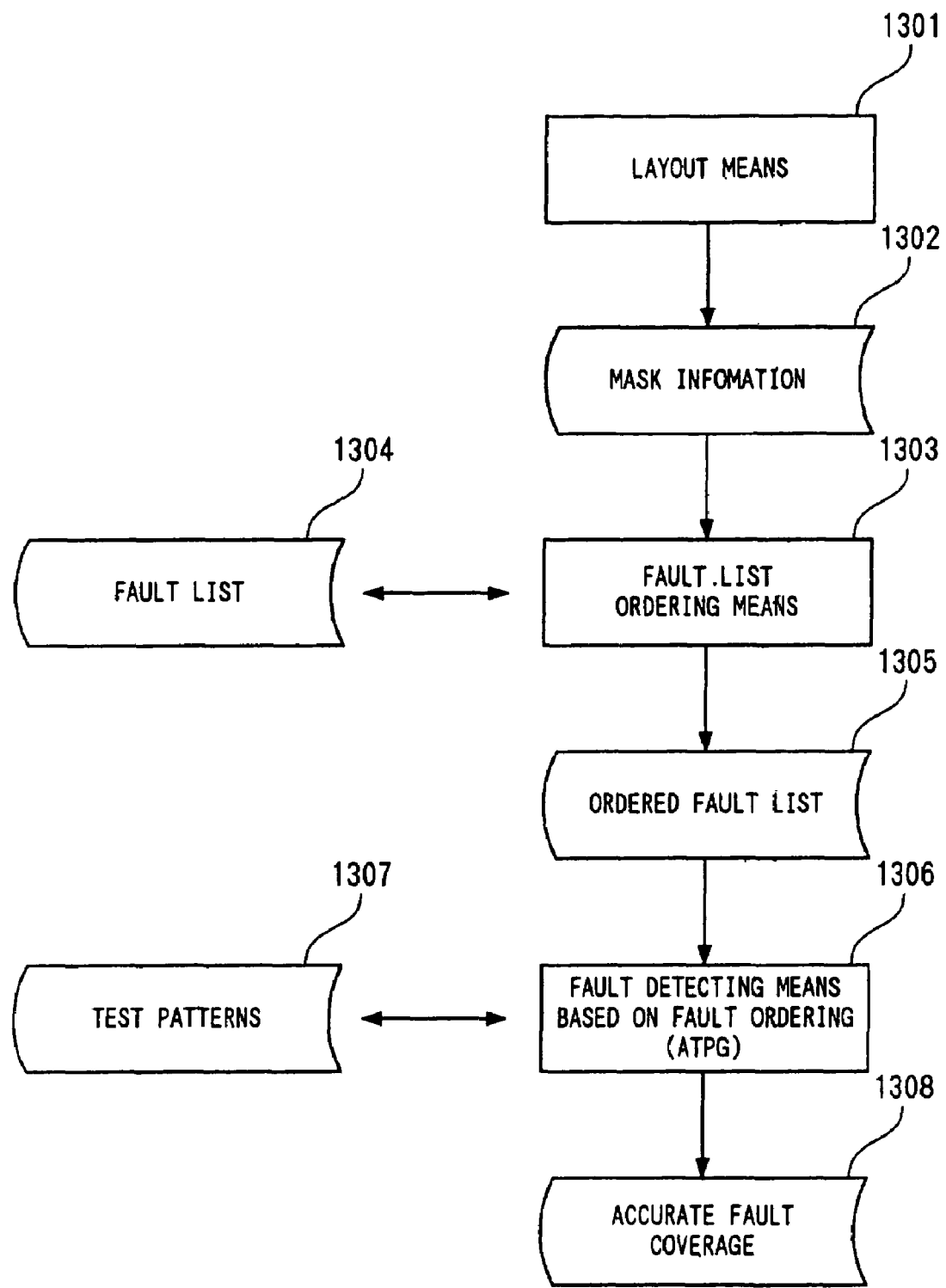
FIG. 10 is a flow chart showing a process procedure for a fault detecting method according to a fifth embodiment of the present invention.

Thus, in the fifth embodiment, a fault list is ordered with the likelihood of actual faults based on mask information in the mask means so that in accordance with this order, detection is preferred for faults or the layout means takes certain measures to prevent actual faults. Specifically, the process is carried out as shown in FIG. 10. First, a layout means 1301 layouts the mask and the wiring. A target fault list 1304 is ordered based on available mask information 1302 (1303). Detection is performed for the faults based on this ordered fault list 1305 (1306) so that an accurate fault coverage 1308 can be efficiently output depending on the likelihood of actual faults. With the normal fault detection, test patterns 1307 are input to a fault detecting means 1306. With the ATPG, the test patterns 1307 are automatically generated.

Figure 11:
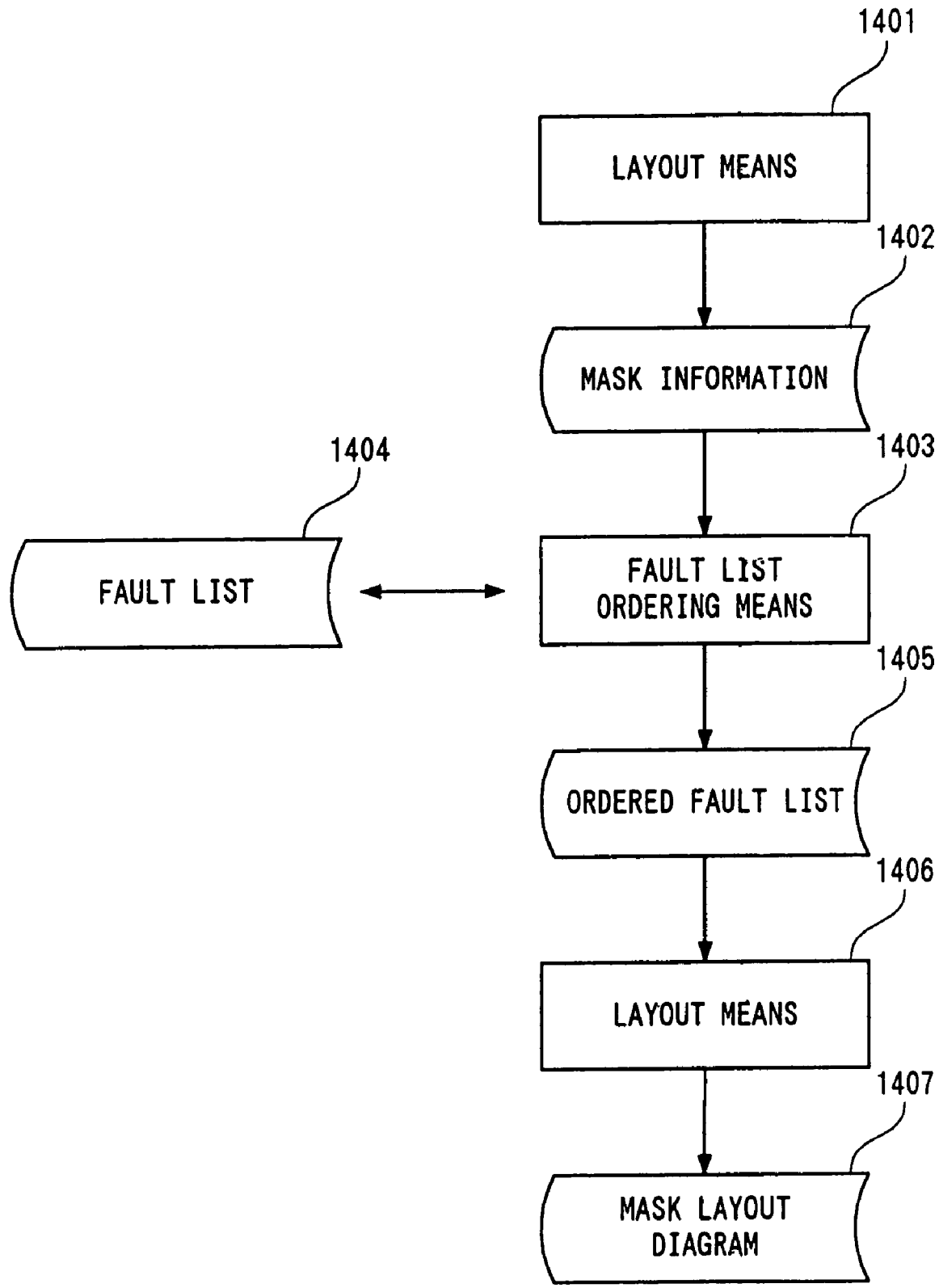
FIG. 11 is a flow chart showing a process procedure for a layout method according to the fifth embodiment of the present invention.

On the other hand, in FIG. 11, a layout means 1401 orders a fault list 1404 based on mask information 1402 (1403), and appropriately arranges the mask and lays out the wiring in sites where a fault is likely to occur actually through a layout means 1406, to generate a final mask layout diagram 1407.

A specific method for ordering the fault list will be described with reference to the circuit diagram in FIG. 12 and the mask layout diagram in FIG. 13. When wires on the mask are close to each other, faults arising from a short circuit or crosstalk are likely to occur. Accordingly, as shown in FIG. 13, the distance Y between the wires is calculated from information on layout coordinates in the mask layout to order faults in such a manner that their likelihood increases with a decrease in the distance between the wires. If, for example, five sites 1, 2, 3, 4, and 5 in FIG. 12 are in the order of 3, 1, 5, 2, and 4 with the distance between wires, a fault is determined to be more likely to occur in this order.

If a mask for a power supply is close to a normal signal line, the power supply may cause noise in the signal line, which may thus become defective. The shaded portion in FIG. 13 denotes the power line. As shown in FIG. 13, the power line is first identified based on the information on the arrangement coordinates in the mask layout and the distance X between the power line and the signal line is calculated from the information on the layout coordinates, so that the fault list is ordered with the likelihood of faults in such a manner that the likelihood increases with a decrease in the distance between the lines.

Figure 12:
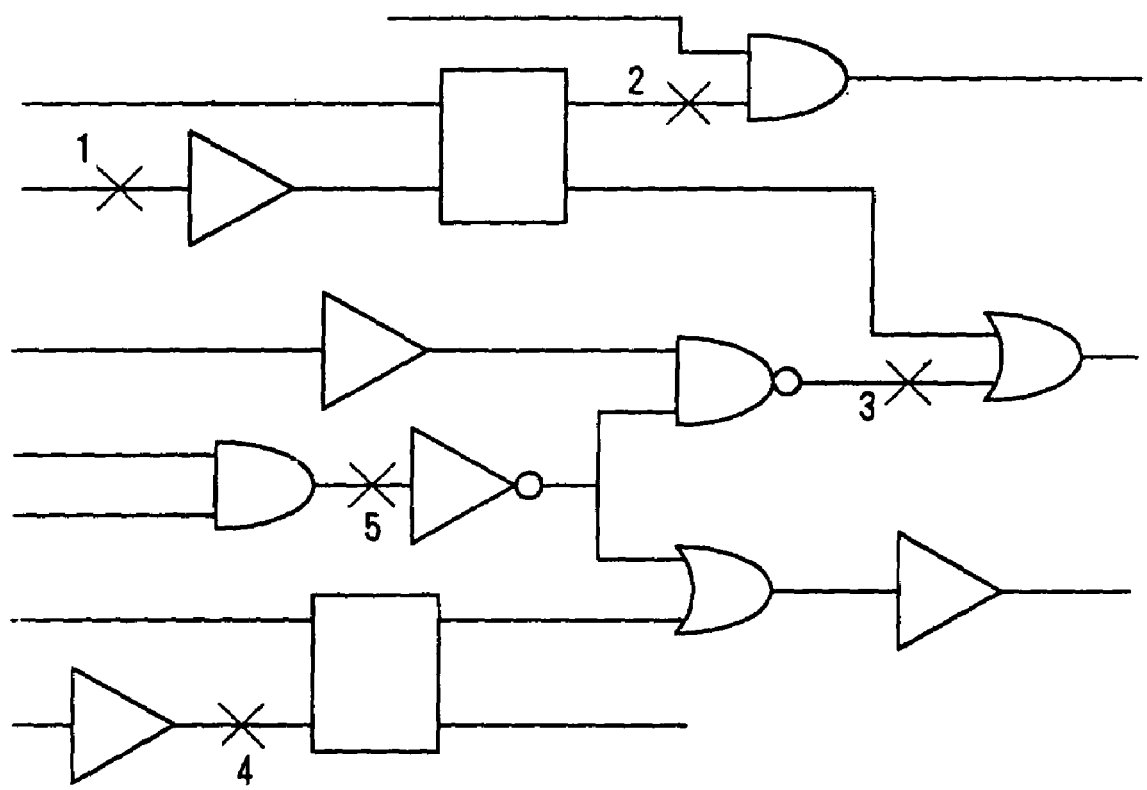
FIG. 12 is a logic circuit diagram useful in explaining ordering of a fault list according to the fifth embodiment of the present invention.
Figure 13:
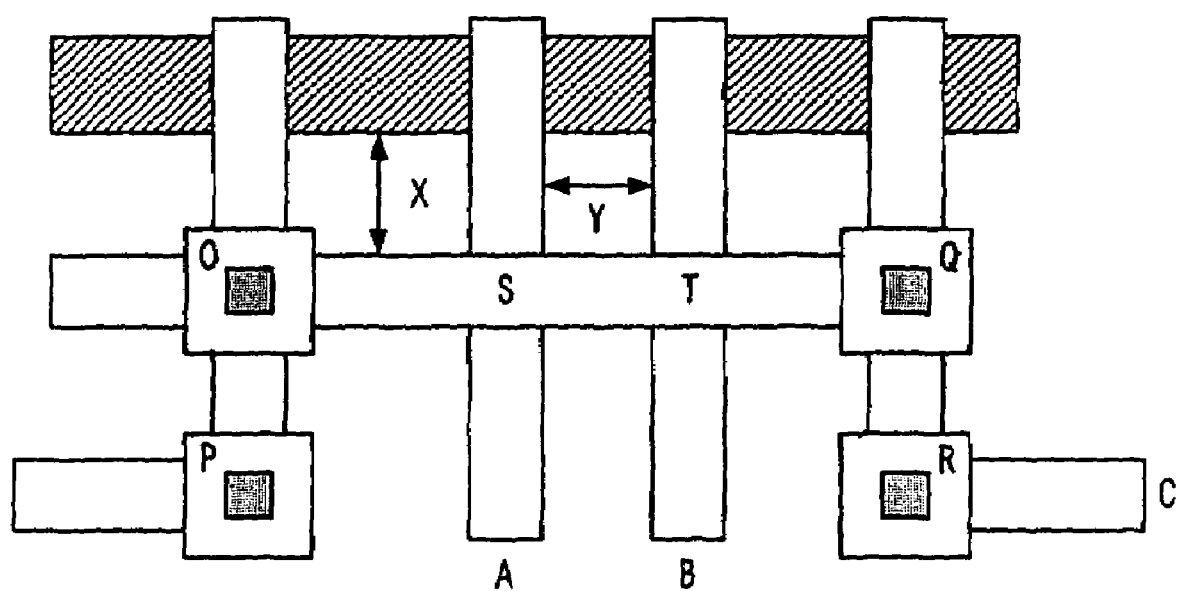
FIG. 13 is a view showing main portions in which the logic circuit diagram in FIG. 12 is replaced with a mask layout diagram.

If, for example, five sites 1, 2, 3, 4, and 5 in FIG. 12 are in the order of 3, 1, 2, 5, and 4 based on the distance between wires, a fault is determined to be more likely to occur in this order.

If a signal line for supplying a cock is close to a normal signal line, the power supply may similarly cause noise in the former signal line, which may thus become defective. In this case, the fault list is ordered in such a manner similar to that described above, by providing the layout device with information on the signal line for supplying a clock.

When many signal lines are crossed over using contacts on the masks, they are likely to be open circuited due to defects in the contacts. Accordingly, as shown in FIG. 13, the same wire is retrieved from the signal line information from the mask layout, the number of contacts is counted, and the fault list is ordered in such a manner that the likelihood of faults increases consistently with the number of contacts. In FIG. 13, a wire C has contacts O, P, Q, and R and the number of contacts is thus four. If, for example, five sites 1, 2, 3, 4, and 5 in FIG. 12 are in the order of 5, 2, 3, 1, and 4 based on the number of contacts, a fault is determined to be more likely to occur in this order.

If signal lines cross each other on the mask, these wires may be short circuited. In FIG. 13, wires A and C cross each other at S. Wires B and C also cross each other at T. Thus, in FIG. 13, the cross state of each of the signal lines (between vertically adjacent layers) in the mask layout is examined and the number of crosses is counted to order the fault list in such a manner that the likelihood of faults increases consistently with the number of crosses in a signal line between vertically adjacent layers. If, for example, five sites 1, 2, 3, 4, and 5 in FIG. 12 are in the order of 3, 2, 5, 1, and 4 based on the number of crosses in a signal line between vertically adjacent layers, a fault is determined to be more likely to occur in this order.

Figure 14:
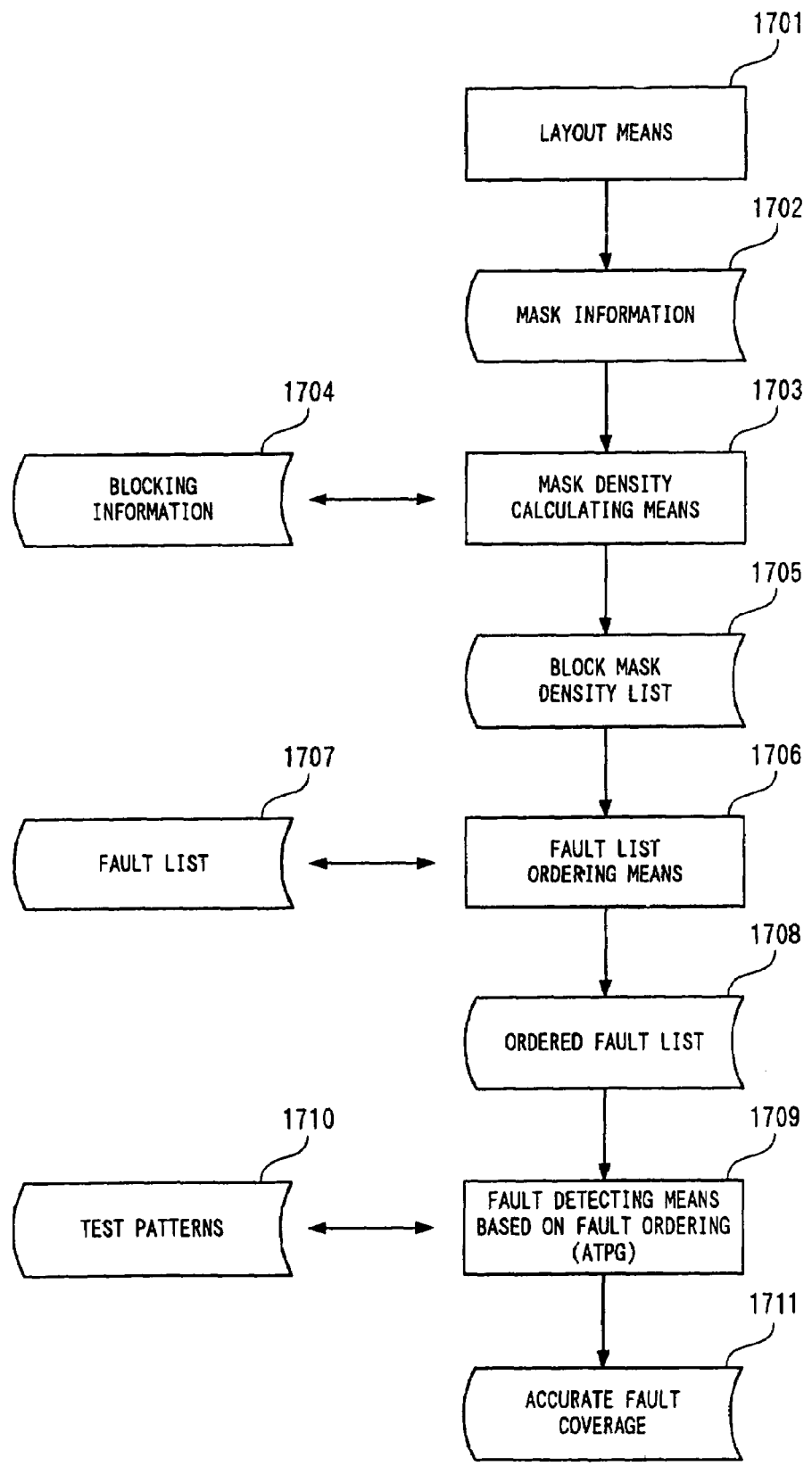
FIG. 14 is a flow chart showing a process procedure for a fault detecting method according to a sixth embodiment of the present invention.
Figure 16:
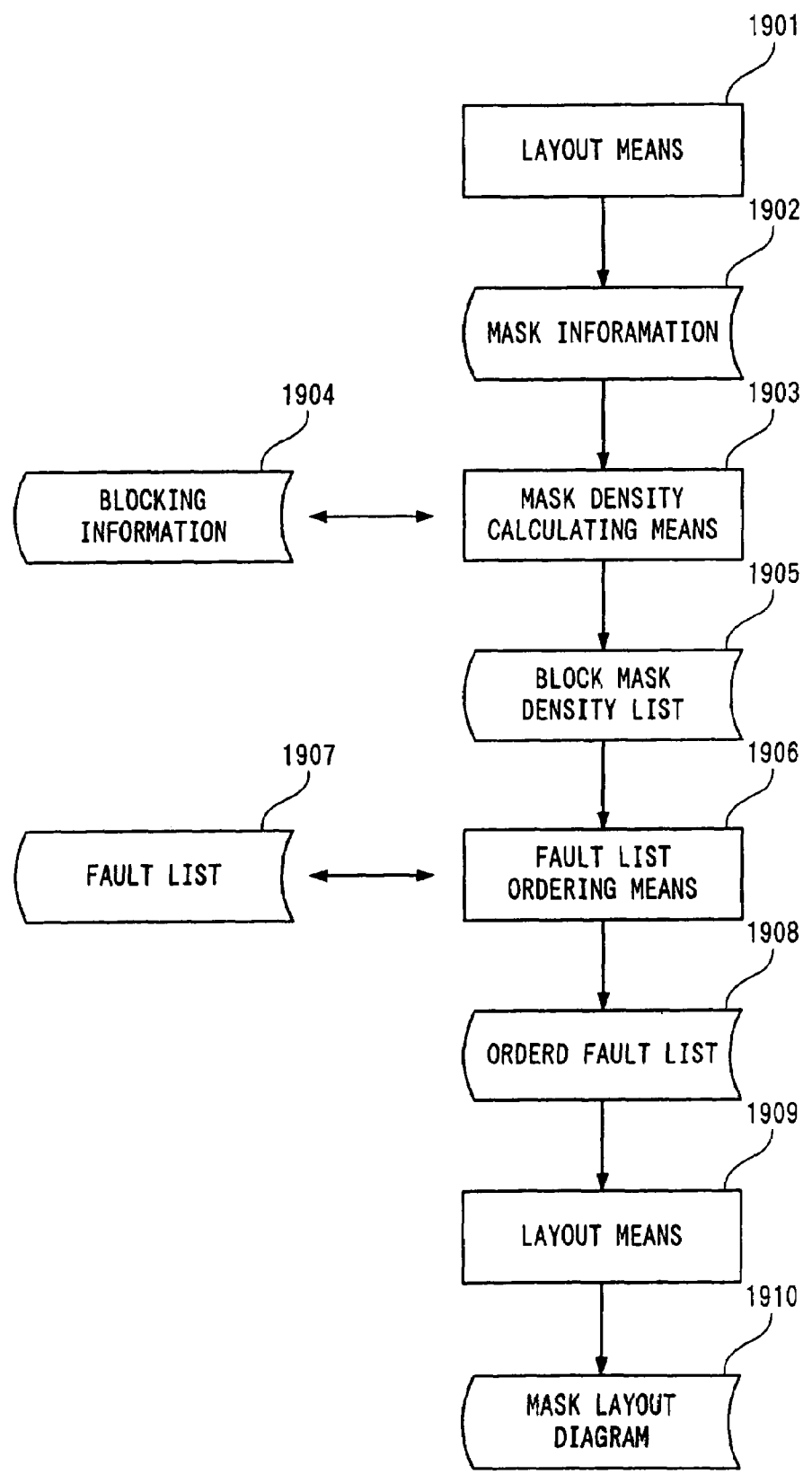
FIG. 16 is a flow chart showing a process procedure for a layout method according to the sixth embodiment of the present invention.

FIGS. 14 to 16 show a sixth embodiment of the present invention. As described above, the density of the mask pattern in FIG. 50 is higher in the order of C, A, D, and B. The likelihood of faults is higher in the same order. The sixth embodiment thus orders the fault list with the density of the mask pattern. The density of the mask pattern is calculated using the following equation:

$$MD = MS \times 100 / BS (\%)$$

where MD denotes the density of the mask pattern, MS denotes the area of a mask pattern portion within a specified block, and BS denotes the area of the specified block.

A specific process flow will be described with reference to FIG. 14. First, a layout means 1701 generates mask information 1702. Then, a mask layout diagram is divided based on blocking information 1704 for dividing the mask layout diagram into individual cells, functional blocks, or other specified blocks, and the mask density of each of the obtained blocks is calculated (1703). A fault list 1707 is ordered based on a list 1705 of mask densities for the generated blocks (1706), detection is performed for the faults based on the ordered fault list 1708 (1709), and an accurate fault coverage 1711 obtained taking the likelihood of actual faults into consideration is output. With the normal fault detection, test patterns 1710 are input to a fault detecting means 1709. With the ATPG, the test patterns 1710 are automatically generated. FIG. 15 shows an example of the mask density list 1705. In this example, a block 1 has a mask pattern density of 90%. The fault is ordered in such a manner that target faults are arranged in the ascending order of the mask pattern density.

In the process in FIG. 16, the fault list is similarly ordered with the mask pattern density, but based on information in the ordered fault list, a mask array and wiring layout means takes certain measures for sites where an actual fault is likely to occur. That is, the mask layout diagram is divided based on mask information 1902 from a layout means 1901 as well as blocking information 1904, and the mask density of each obtained block is calculated (1903). A fault list 1907 is ordered based on a list 1905 of mask densities for the generated blocks (1906), and based on information in the ordered fault list 1908, the mask and wiring layout means 1909 takes certain measures for sites where an actual fault is likely to occur, thereby generating a final mask layout diagram 1910.

Figure 18:
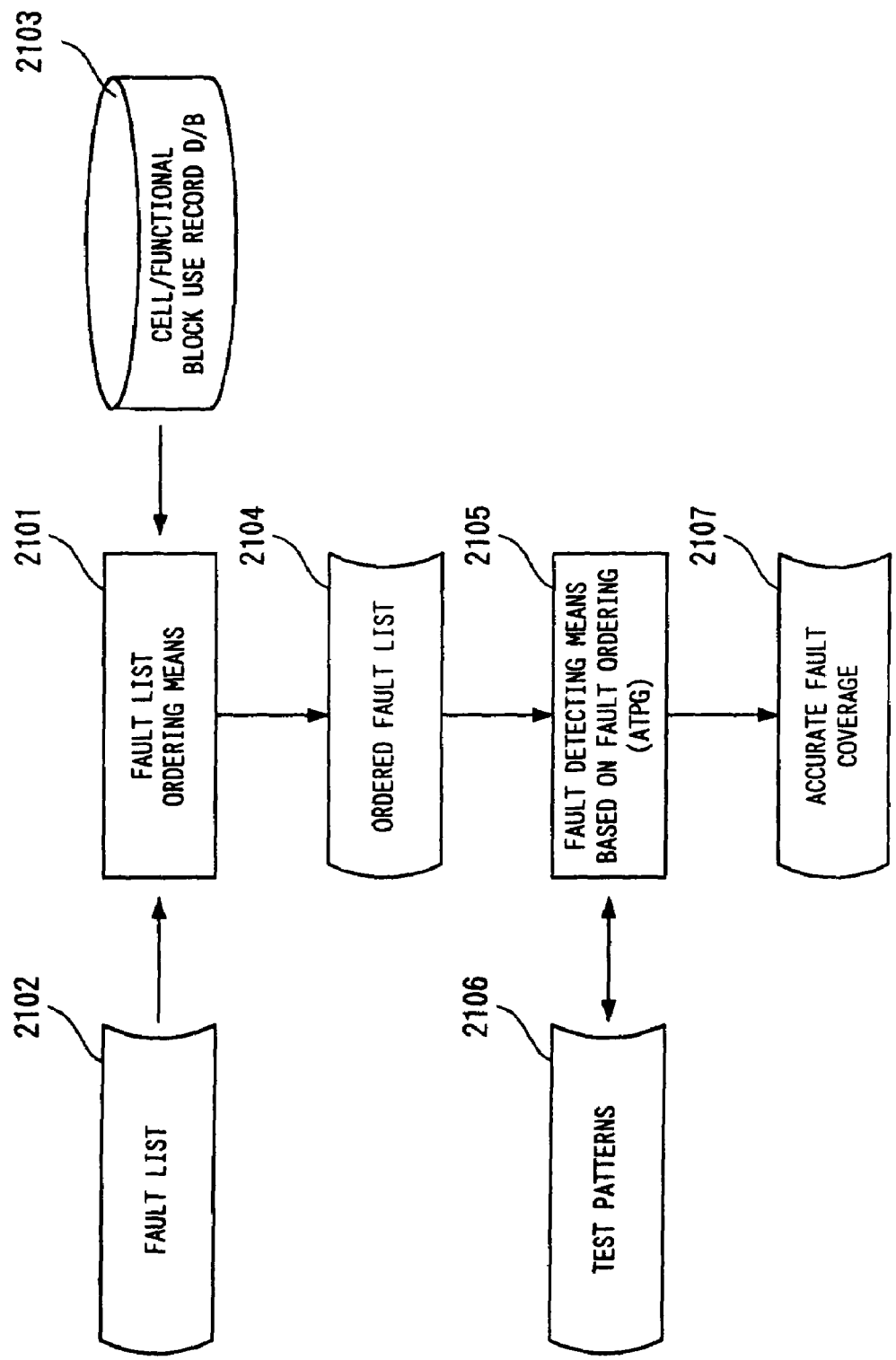
FIG. 18 is a flow chart showing a process procedure for a fault detecting method according to the seventh embodiment of the present invention.
Figure 19:
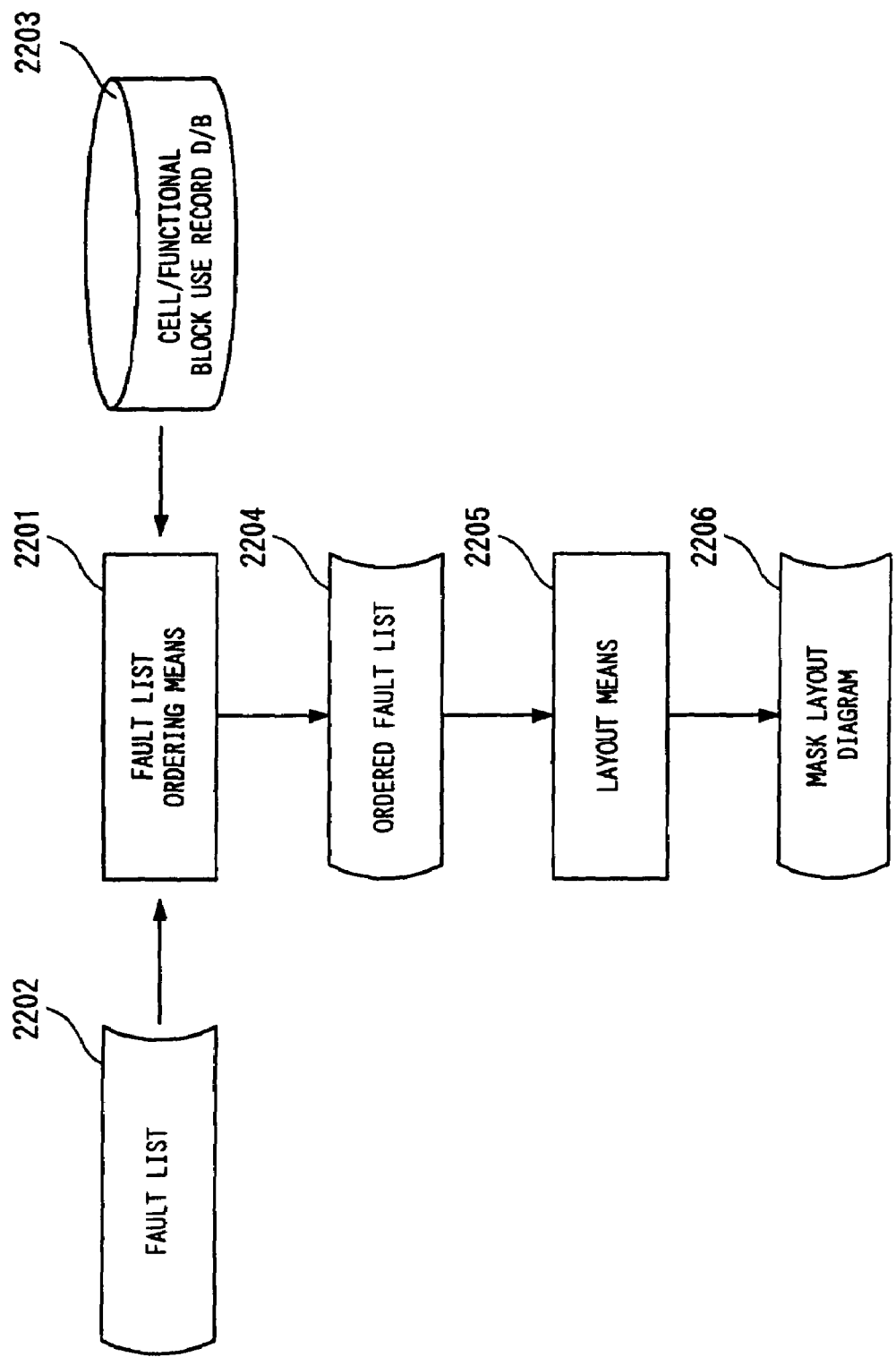
FIG. 19 is a flow chart showing a process procedure for a layout method according to the seventh embodiment of the present invention.

FIGS. 17 to 19 show a seventh embodiment of the present invention.

If a new process, a cell that has been newly developed but has few records of use, or a cell or functional block the reliability of which has not been proved is used in the integrated circuit, a fault is likely to occur. The fault detection or layout must take such records of past use into consideration. The method shown in the seventh embodiment assemble records of past use of cells, functional blocks, or the like into a database so that these records of use can be taken into account during the fault detection and the mask layout to obtain an accurate fault coverage depending on the likelihood of actual faults and to takes certain measures for sites where an actual fault is likely to occur.

FIG. 17 shows a specific example of a database. This database comprises the names of cells or functional blocks used in an integrated circuit, the number of times that each block has been used in the circuit, the number of past defects if any, the status of each block in reliability tests, and the number of successful processes inside the integrated circuit. For the reliability test status, for example, the mark "⊙" indicates that predetermined criteria have been met, the mark "○" indicates that the criteria have not been met because the reliability test has not been completed, and the mark "Δ" indicates that a problem has been found through the reliability test.

FIG. 18 shows a specific process flow. A fault list 2102 ordering means 2101 loads information from a cell and block use record database 2103 and orders target faults. Detection is performed for faults is performed for the faults based on the ordered fault list 2104 (2105) to output an accurate fault coverage 2107 depending on the likelihood of actual faults. With the normal fault detection, test patterns 2106 are input to a fault detecting means 2105. With the ATPG, the test patterns 2106 are automatically generated.

In FIG. 19, the fault list is ordered based on the functional block use record database as in FIG. 18, but in this case, based on information in the ordered fault list, a mask and wiring layout means takes certain measures for sites where an actual fault is likely to occur. Specifically, a fault list 2202 is ordered based on information in a cell and functional block use record database 2203 (2201), and based on the ordered fault list 2204, a mask and wiring layout means 2205 takes certain measures for sites where an actual fault is likely to occur, thereby generating a final mask layout diagram 2206.

FIG. 20 shows an eighth embodiment of the present invention.

The fault coverage is a measure indicating how easily a target fault can be detected in a test pattern used, and is calculated during the fault detection. The target fault must originally have a possibility of occurring actually. Possible faults, however, are not uniform in their likelihood. Some possible faults are more likely to occur than others. The conventional fault detecting means, however, does not take the likelihood of actual faults into consideration but processes them uniformly. That is, likely and unlikely faults are equally processed so that whenever a target fault is detected, the fault detection is incremented and otherwise it is considered to be undetected.

In this case, even when an unlikely fault is detected to increment the fault detection, the possibility of a fault occurring actually increases if a likely fault, that is, a fault to be noted has not been detected. An original object of the fault coverage is to detect actual faults. To achieve this object, the test patterns must allow likely faults to be preferentially detected. That is, for the fault coverage, likely faults must be imparted with a higher weight than unlikely faults.

In FIG. 20, if there are a number of target faults including one fault at point A, zero fault at point A, and one fault at point B, each target fault is conventionally equally weighted. With the likelihood of actual faults taken into account, however, the faults must weighted; in this figure, the average value of the weight is set at 1.0 so that for example, the one fault and zero fault at the point A are set at 0.2 because they are unlikely to occur, whereas the one fault at the point B is set at 1.8 because it is likely to occur actually.

The relationship between the defect level in the market and the fault coverage is conventionally expressed by the above described Equation (1). This equation treats a fault as a single degenerative one, but due to the ever increasing scale and decreasing size of recent integrated circuits, there are expected to be new faults that cannot be expressed by the conventional single stuck-at fault model. That is, it is likely that the relationship between the defect level in the market and the fault coverage will be unable to be expressed by Equation (1). A new measure for the fault coverage is thus important which weights faults taking the occurrence of actual faults into consideration. Such a measure enables the relationship between the fault coverage and the defect level in the market to be more correctly derived, thereby reducing the defect level in the market.

Figure 21:
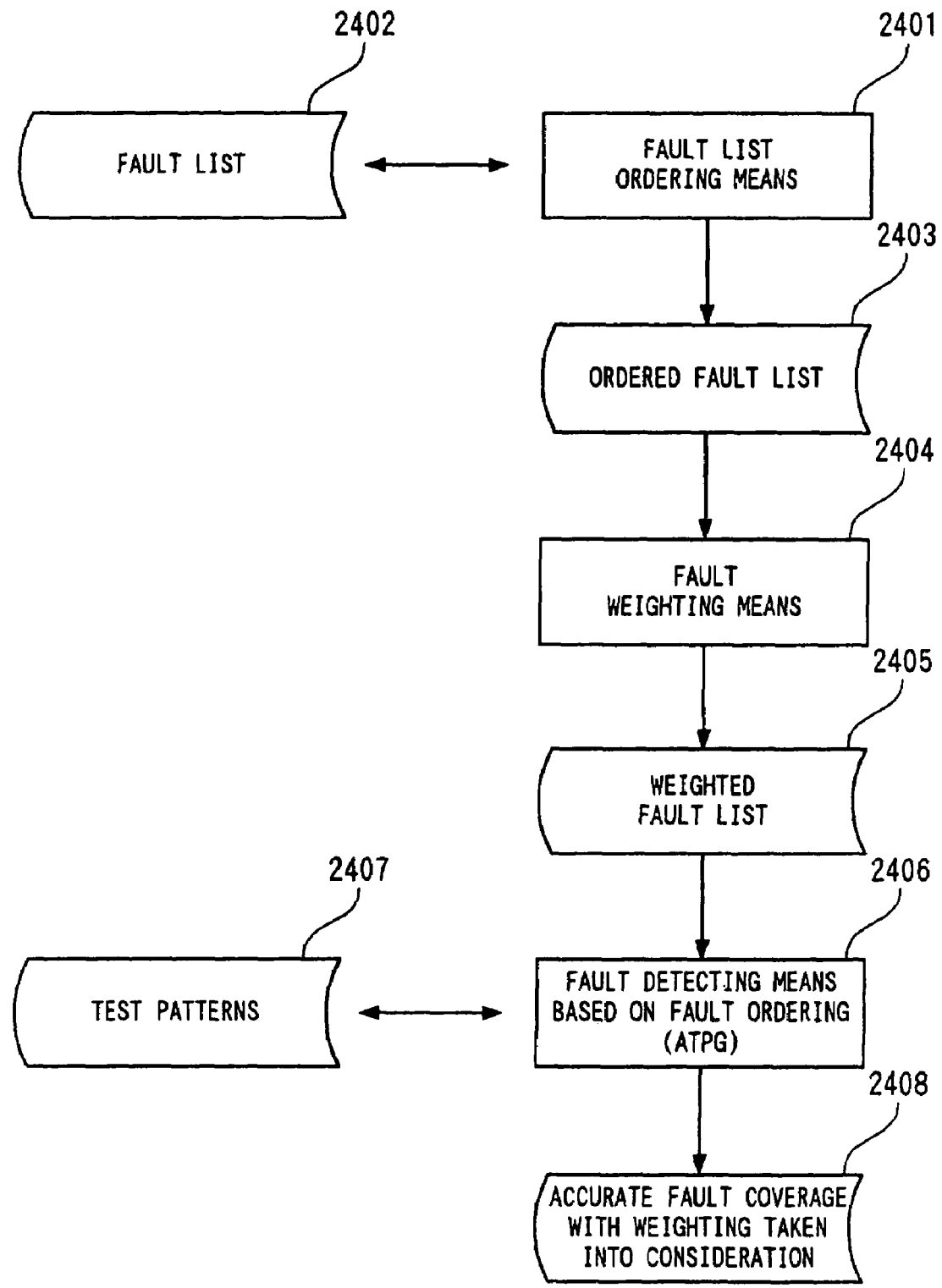
FIG. 21 is a flow chart showing a process procedure for a fault detecting method according to a ninth embodiment of the present invention.

FIGS. 21 to 23 show a ninth embodiment of the present invention. A specific method for the above described weighting of faults will be shown.

That is, target faults are ordered with their likelihood so that weights on the faults are varied at a fixed rate in accordance with this ordering. A specific process procedure is shown in FIG. 21. An ordering means 2401 orders a fault list 2402, and a fault weighting means 2404 weights the generated ordered fault list 2403. Detection is performed for faults is performed for the faults based on the generated weighted fault list 2405 (2406) to calculate an accurate fault coverage 2408 taking the weighting into consideration. With the normal fault detection, test patterns 2407 are input to a fault detecting means 2406. With the ATPG, the test patterns 2407 are automatically generated.

In FIG. 21, detection is performed for the faults based on the weighted fault list, but they may be weighted after the normal fault detection, which does not involve the weighting, thereby recalculating an accurate fault coverage using the weighting.

FIG. 22 shows a specific example of the weighting. The rate of variations in weighting is expressed by:

$$d=2/(n+1)$$

where d denotes the rate of variations in weighting and n denotes the number of target faults, which is 39 in the example in FIG. 22. The rate of variations in weighting is 2/(39+1)=0.05. One fault at a point L is imparted with the lowest weight of 0.05. Zero fault at a point K is imparted with the second lowest weight of 0.10, which is determined by adding 0.05 to the weight on the fault at the point L. Zero fault at a point T is imparted with an intermediate weight of 1.0. One fault at a point H is imparted with the highest weight of 1.95.

Next, a specific fault coverage is calculated. As shown in FIG. 23, the weighted faults are assumed to be detected or undetected. The conventional method for calculating the fault coverage simply calculates it from the total number of faults and the number of detected faults.

$$\text{Conventional failure detection rate} = \frac{\text{Number of detected failures}}{\text{Total number of failures}} \times 100(\%)$$

The fault coverage obtained according to the present invention taking the weighting into account is calculated as shown in Equation (3).

$$\text{Failure detection rate based on weighting} = \frac{1.95 + 1.90 + 1.80 + \ldots + 1.00 + \ldots + 0.05}{\text{Total of weights (total number of failures)}} \times 100(\%)$$

That is, the fault coverage is calculated by adding a weight on each detected fault to the total weight or the total number of faults in such a manner that 1.95+1.90+1.80+ . . . +1.00+ . . . 0.05.

Figure 24:
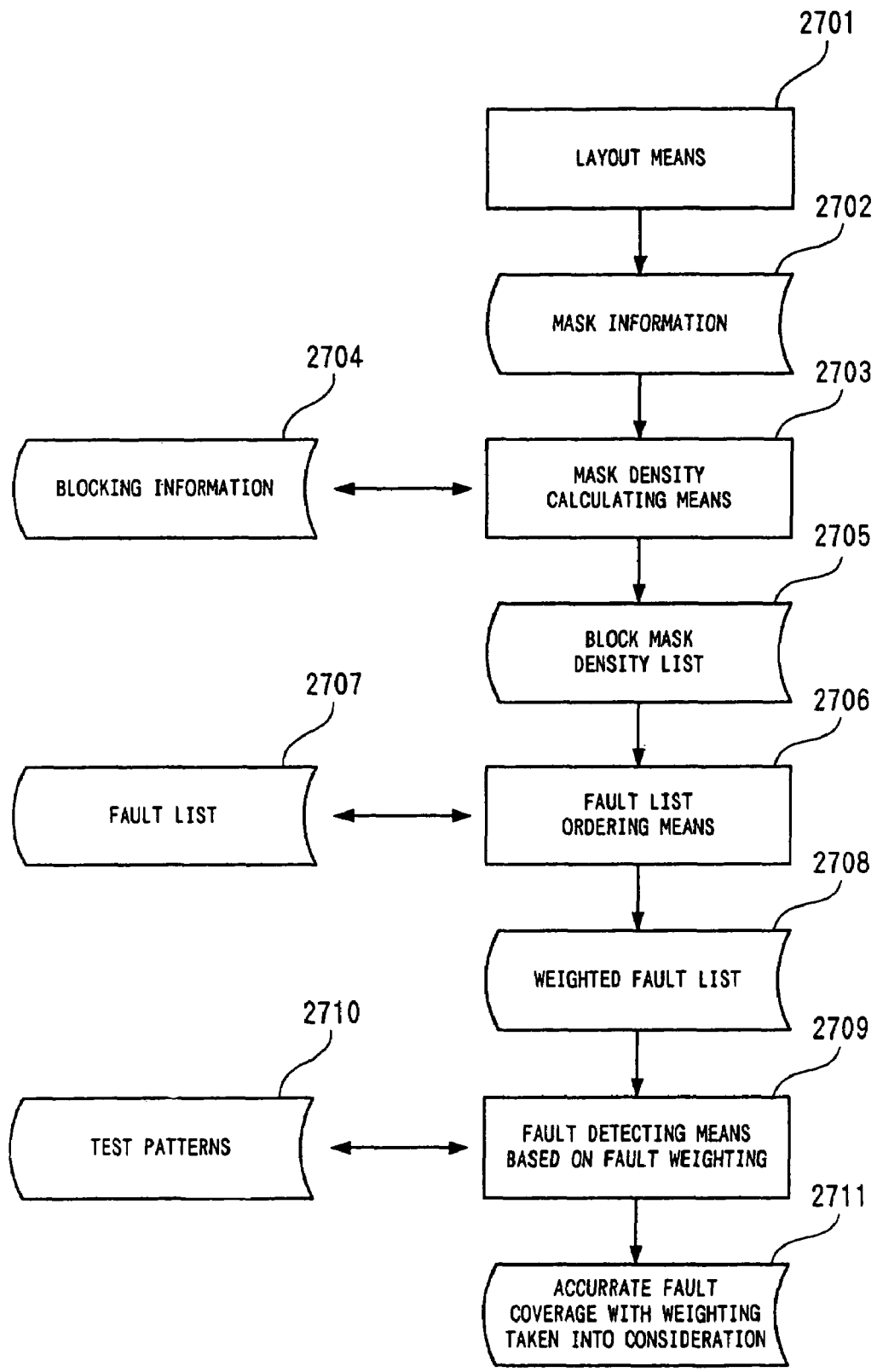
FIG. 24 is a flow chart showing a process procedure for a fault detecting method according to a tenth embodiment of the present invention.

FIGS. 24 and 25 show a tenth embodiment of the present invention. Also in this embodiment, a specific example of the fault weighting is shown. The mask density of a cell or a functional block is calculated based on mask information obtained from the layout means, and faults are then weighted with the ratio of this mask density to an average value corresponding to the mask density of the entire integrated circuit.

A specific process flow will be explained with reference to FIG. 24. First, a layout means 2701 generates mask information 2702. Then, a mask layout diagram is divided based on blocking information 2704 for dividing the mask layout diagram into individual cells or functional blocks, and the mask density of each obtained block is calculated (2703) to generate a list 2705 of mask densities for the blocks. The calculation means 2703 also generates the mask density of the entire chip of the target integrated circuit (hereafter referred to as an "average mask density"). Each of the target faults shown in the fault list 2707 is weighted with the ratio of the mask density of each generated block to the average value (2706). Each fault is weighted depending on the mask density of a cell or a functional clock directly affecting this fault. Detection is then performed for the faults based on the weighted fault list 2708 (2709) to output an accurate fault coverage 2711 taking the weighting into consideration. With the normal fault detection, test patterns 2710 are input to a fault detecting means 2709. With the ATPG, the test patterns 2710 are automatically generated.

In FIG. 24, detection is performed for the faults based on the weighted fault list, but they may be weighted after the normal fault detection, which does not involve the weighting, thereby recalculating an accurate fault coverage using the weighting.

FIG. 25 shows an example of a weighted fault list. The mask density of one chip, corresponding to the average mask density, is 1.0. The mask density of a cell or a functional block is determined based on its ratio to the average value, and is directly used for the weighting. Each target fault is weighted according to the mask density of a cell or a functional clock directly affecting this fault. For example, a fault A relates to a block A, which is imparted with a weight of 0.9, so that the fault A is also imparted with a weight of 0.9.

Figure 26:
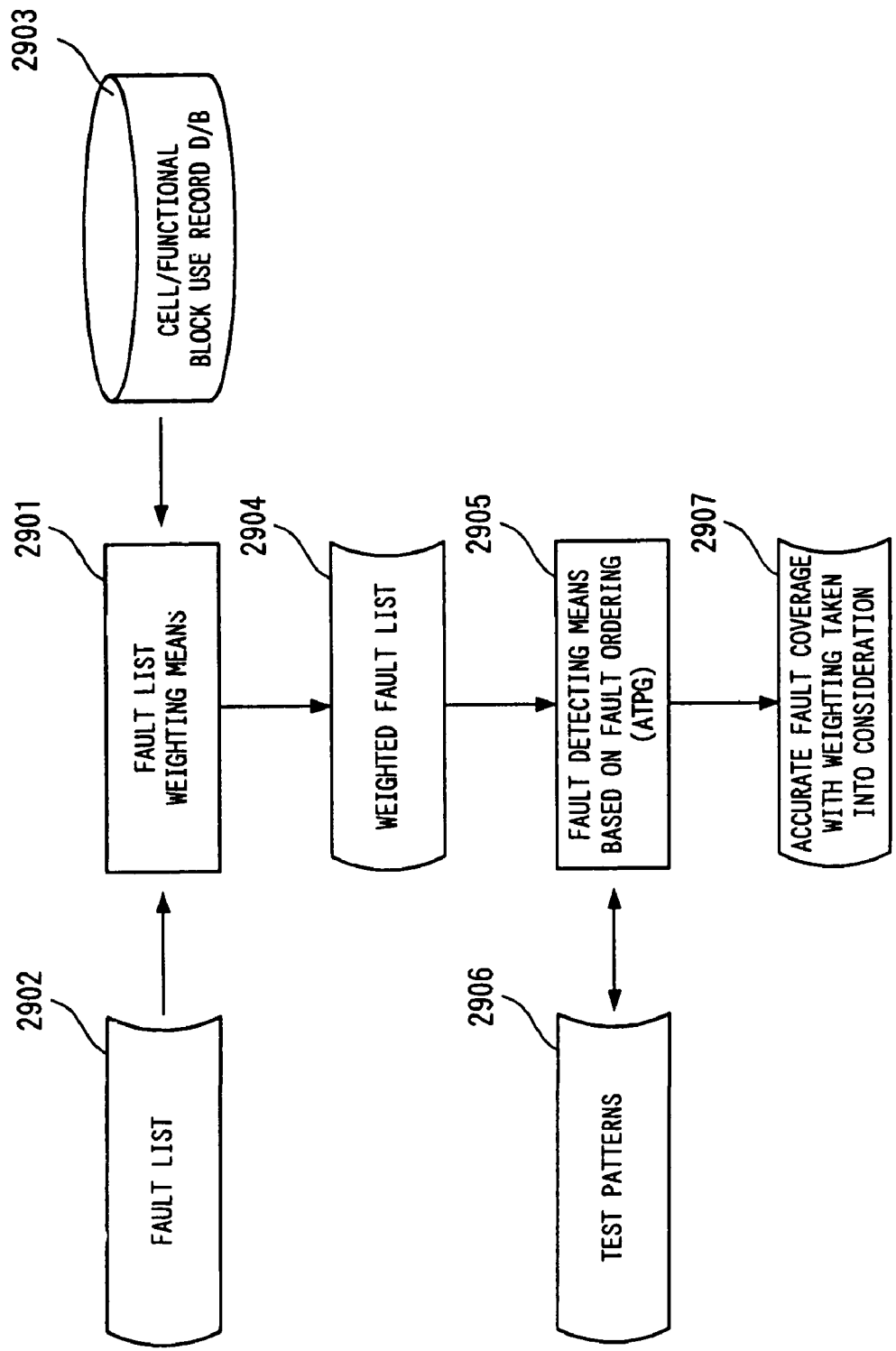
FIG. 26 is a flow chart showing a process procedure for a fault detecting method according to an eleventh embodiment of the present invention.

FIG. 26 shows an eleventh embodiment of the present invention. Also in this embodiment, a specific example of the fault weighting is shown. According to this embodiment, faults are weighted based on records of past use of cells, functional blocks, or the like used in an integrated circuit. For example, the above described database shown in FIG. 17 is used for the records of past use of the cells, functional blocks, or the like. In FIG. 17, a fault is imparted with a higher weight as a corresponding cell or functional block has lower records of use, more defects in the past, or more problems found through reliability tests, or has undergone less processes. FIG. 17 shows records of use of cells or functional blocks, but each target fault is weighted based on the records of past use of a cell or a functional block directly affecting this failing site.

According to the procedure in FIG. 26, a fault list 2902 is weighted based on use record database 2903 for cells or functional blocks (2901). Detection is performed for the faults (2905) on the weighted fault list 2904 to output an accurate fault coverage 2907 taking the weighting into account. With the normal fault detection, test patterns 2906 are input to a fault detecting means 2905. With the ATPG, the test patterns 2906 are automatically generated.

In FIG. 26, detection is performed for the faults based on the weighted fault list, but they may be weighted after the normal fault detection, which does not involve the weighting, thereby recalculating an accurate fault coverage using the weighting.

Figure 27:
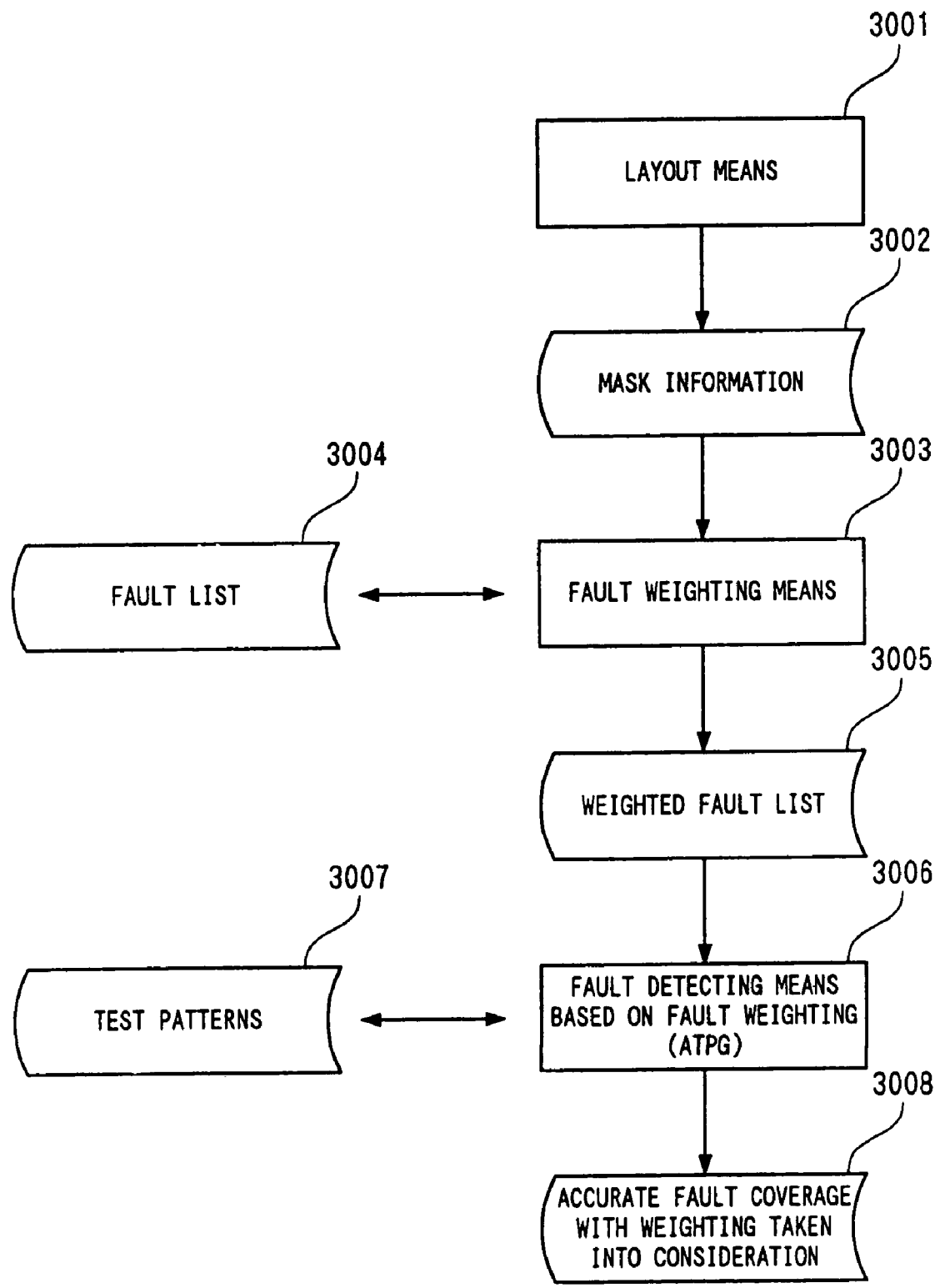
FIG. 27 is a flow chart showing a process procedure for a fault detecting method according to a twelfth embodiment of the present invention.

FIG. 27 shows a twelfth embodiment of the present invention. Also in this embodiment, a specific example of the fault weighting is shown. According to this embodiment, faults are weighted based on mask information obtained from a layout means. Specifically, the weighting is based, for example, on the ordering of the fault list described above with reference to the mask diagrams in FIGS. 12 and 13.

FIG. 27 shows a specific process procedure. First, a fault list 3004 is weighted based on mask information 3002 generated by a layout means 3001 (3003). Detection is performed for faults is performed for the faults (3006) on the weighted fault list 3005 to output an accurate fault coverage 3008 taking the weighting into account. With the normal fault detection, test patterns 3007 are input to a fault detecting means 3006. With the ATPG, the test patterns 3007 are automatically generated. In FIG. 27, detection is performed for the faults based on the weighted fault list, but they may be weighted after the normal fault detection, which does not involve the weighting, thereby recalculating an accurate fault coverage using the weighting.

Figure 28:
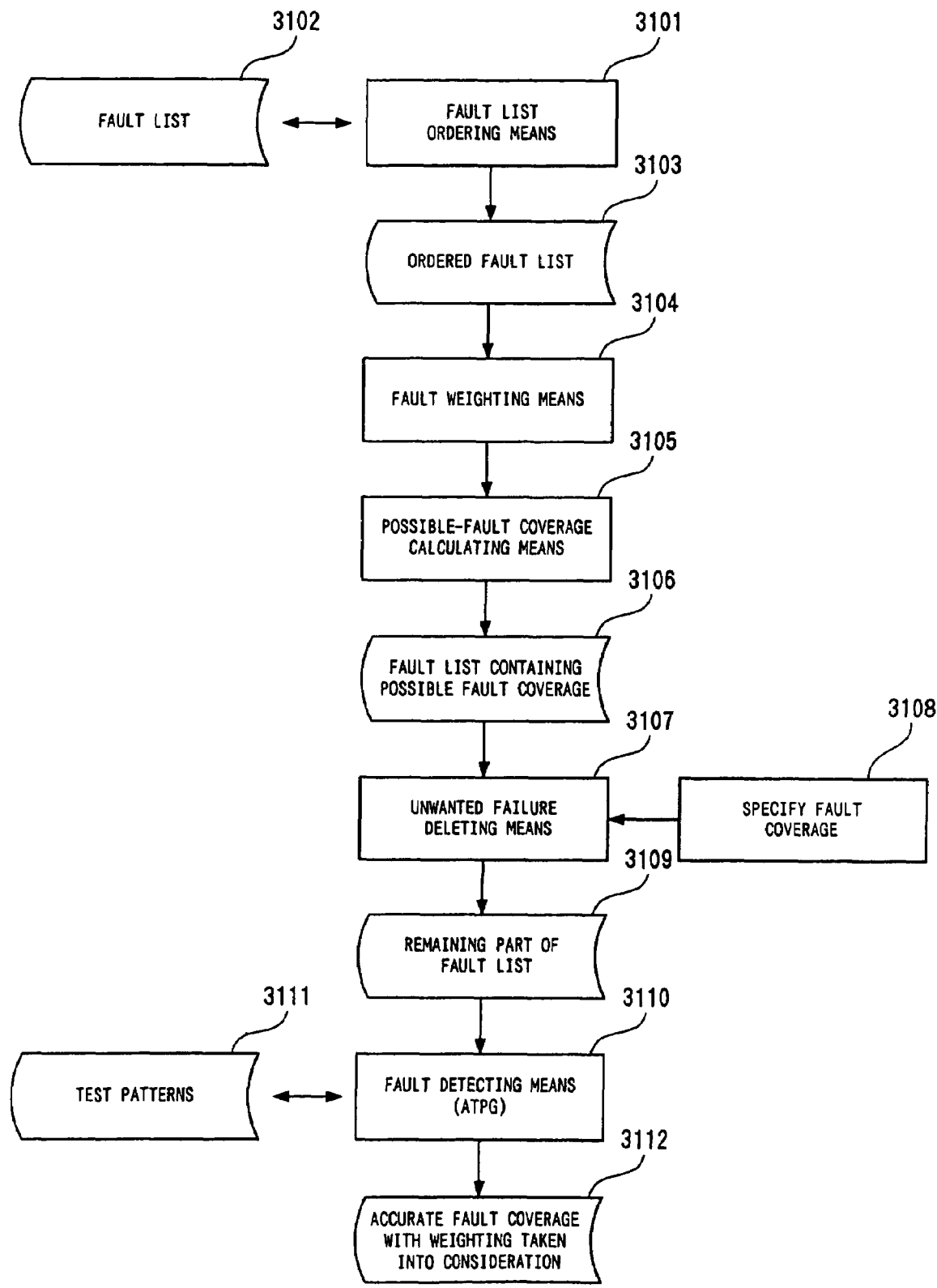
FIG. 28 is a flow chart showing a process procedure for a fault detecting method according to a thirteenth embodiment of the present invention.
Figure 30:
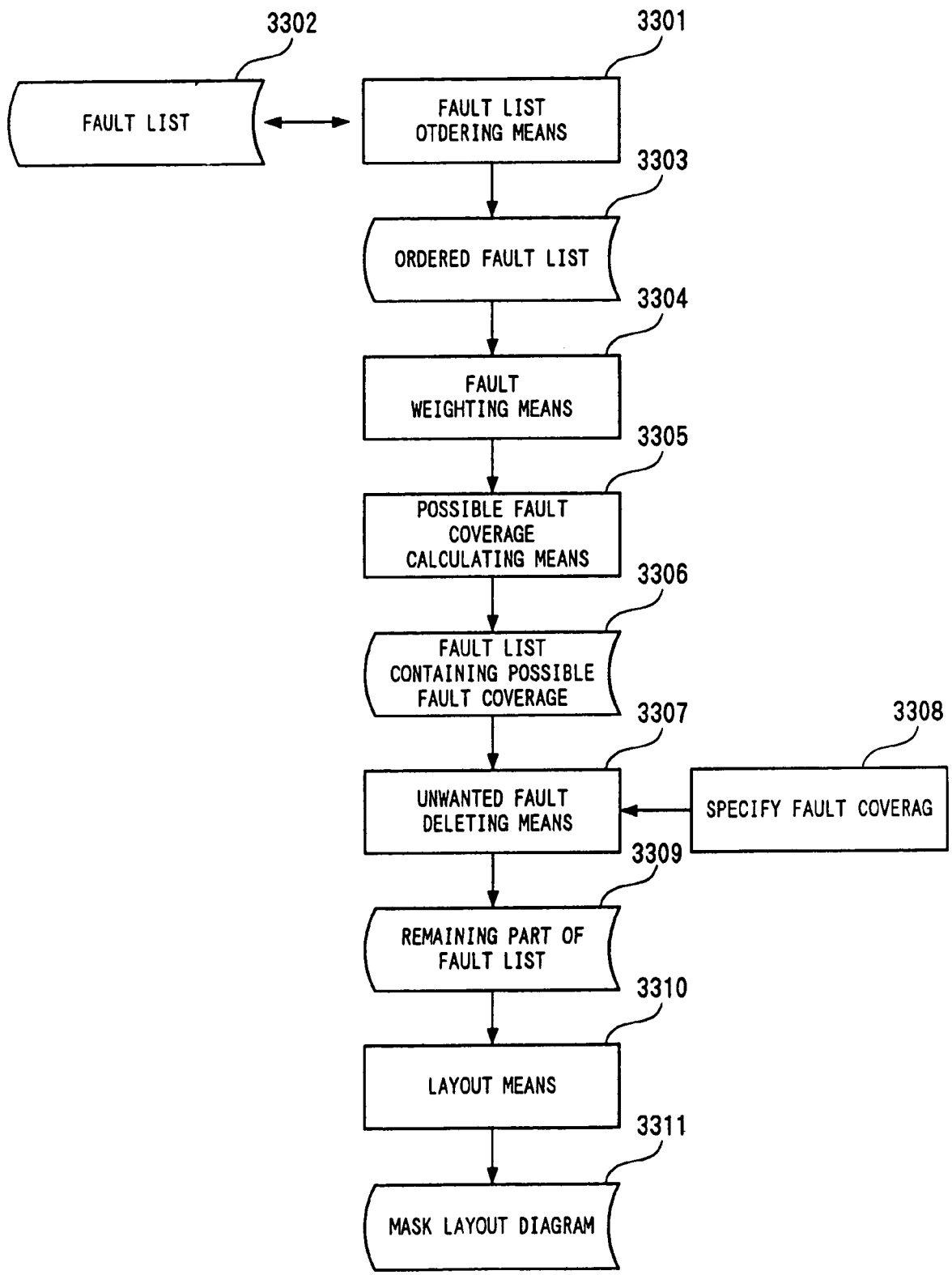
FIG. 30 is a flow chart showing a process procedure for a layout method according to the thirteenth embodiment of the present invention.

FIGS. 28 to 30 show a thirteenth embodiment of the present invention. Since the fault detection is time-consuming, this process is desirably efficiently carried out by omitting faults that are unlikely to occur actually. Thus, when faults are ordered and weighted with their likelihood, faults that must be subjected to detection can be preferentially processed and a fault coverage can be calculated which may be obtained if each target fault is detected. The method according to this embodiment provides a fault coverage to be achieved, and sequentially extracts faults required to obtain this fault coverage in the order of their likelihood while treating the remaining target faults as unwanted to avoid processing them, thereby achieving an effective fault detection.

FIG. 28 shows a specific process procedure. In this case, a fault list ordering means 3101 orders a fault list 3102. A fault weighting means 3104 weights the generated fault list 3103 and calculates a possible fault coverage (3105) to generate a fault list 3106 including the possible fault coverage. A fault coverage to be achieved is also specified (3108) and unwanted faults are deleted from the fault list 3106 (3107). Detection can be then performed for the remaining faults based on the fault list 3109 (3110) to effectively output an accurate fault coverage 3112 taking the weighting into consideration. With the normal fault detection, test patterns 3111 are input to a fault detecting means 3110. With the ATPG, the test patterns 3111 are automatically generated.

FIG. 29 shows an example of the fault list 3106 including the possible fault coverage as in the above described example in FIG. 22. When only one fault at a point H is detected, since the total number of faults is 39, the possible fault coverage is 1.95×100/39=5.0%. Likewise, when faults up to one at a point I have been detected, the possible fault coverage is 9.9%. Further, when faults up to zero at a point K, where a fault is unlikely to occur, have been detected, the possible fault coverage is 99.9%. Moreover, when all the faults, including one at a point L, where a fault is most unlikely to occur, have been detected, the possible fault coverage is 100%. Then, when 15% is specified for a target fault coverage, faults up to one at a point G need to be detected.

FIG. 30 shows the same process as FIG. 28 before unwanted faults are deleted, but in this case, for the remaining part of the fault list, a mask and wiring layout means takes certain measures for sites where an actual fault is likely to occur. That is, a fault list 3302 is ordered (3301), the faults in the generated fault list 3303 are weighted (3304), and a possible fault coverage is calculated (3305). Unwanted faults are removed from the generated fault list 3306 in accordance with a fault coverage 3308 to be achieved (3307). A layout means 3310 takes certain measures for the remaining part 3309 of the fault list to generate a final mask layout diagram 3311.

Figure 31:
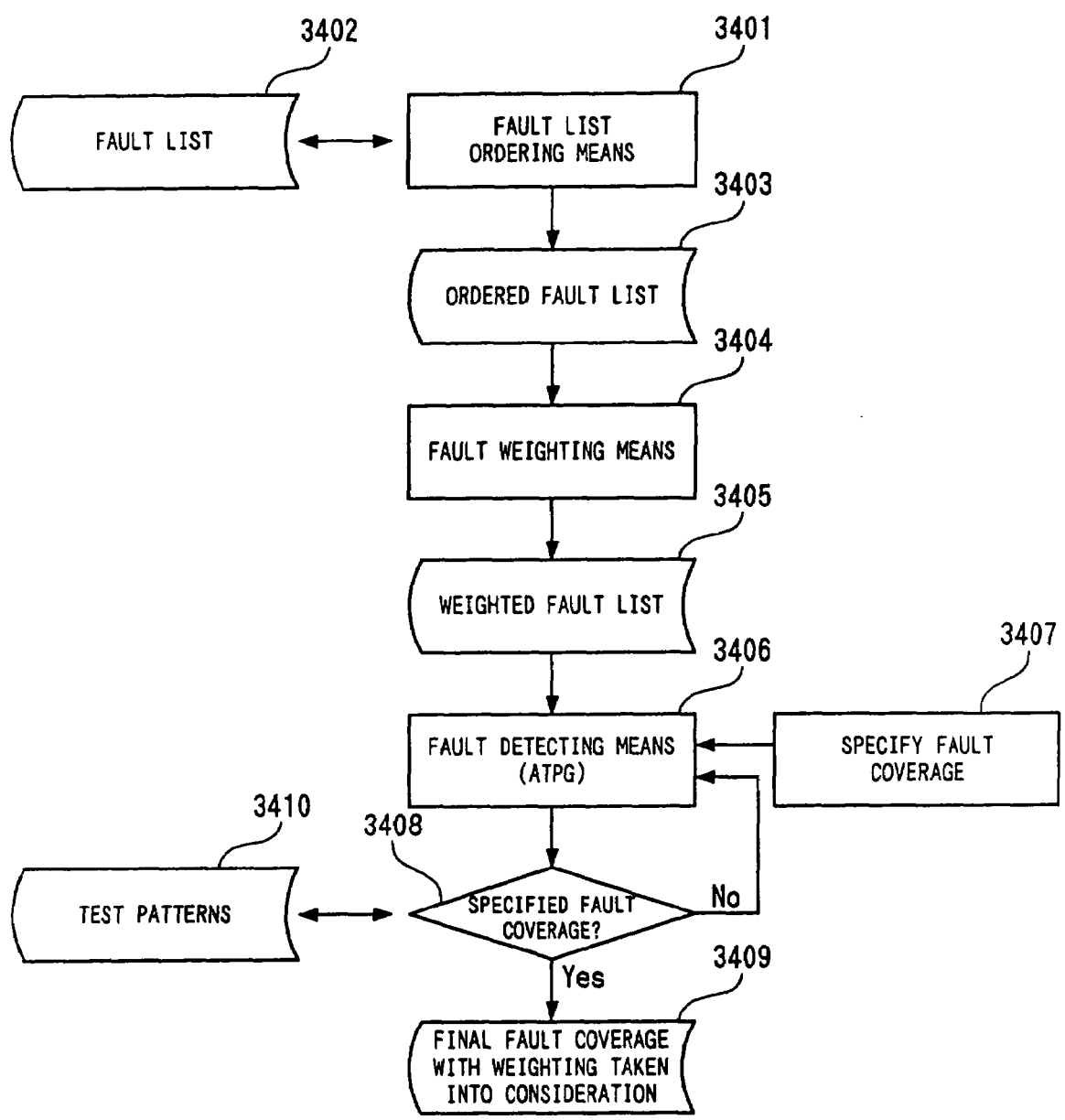
FIG. 31 is a flow chart showing a process procedure for a fault detecting method and a layout method according to a fourteenth embodiment of the present invention.

FIG. 31 shows a fourteenth embodiment of the present invention. In the above described thirteenth embodiment, to effectively perform detection for the faults, the faults unnecessary for the fault coverage to be achieved are removed before the fault detection. According to this embodiment, however, instead of omitting the unwanted faults beforehand, it is checked during the fault detection whether the target fault coverage has been reached so that once the target has been reached, the fault detection is stopped despite the remaining faults.

FIG. 31 shows a specific process procedure. First, a fault list ordering means 3401 orders a fault list 3402. Then, a fault weighting means 3404 weights the generated fault list 3403 to generate a weighted fault list 3405. This fault list is used to perform fault detection for the faults (3406). At the beginning of the fault detection, a target fault coverage is specified (3407). During the fault detection 3406, each time a target fault has been processed, it is checked whether the specified fault coverage has been reached (3408). If it has not been reached, the next target fault is processed. On the other hand, if the target fault coverage has been reached, the fault detecting process is ended to output a final fault coverage 3409 taking the weighting into consideration. With the normal fault detection, test patterns 3410 are input to a fault detecting means 3406. With the ATPG, the test patterns 3410 are automatically generated.

The fault list may be output once the fault coverage specified by the fault detecting means has been reached so that the layout means can take certain measures based on this fault information to generate the final mask layout diagram.

Next, a further fault detecting method according to the present invention will be described.

An detection device called a "tester" is generally used to perform detection for faults in a semiconductor integrated circuit. Information including time, a signal status, and a signal detecting terminal which is output by the tester when the semiconductor integrated circuit malfunctions is collectively called a "fail log". As described below, it is a main object of the present invention to simply and accurately extract suspected failing sites from a netlist in a relatively short time by changing measuring conditions in the tester to modify a fail log, comprehensively analyzing a plurality of fail logs, or adding physical layout information on the mask layout and wiring.

Figure 32:
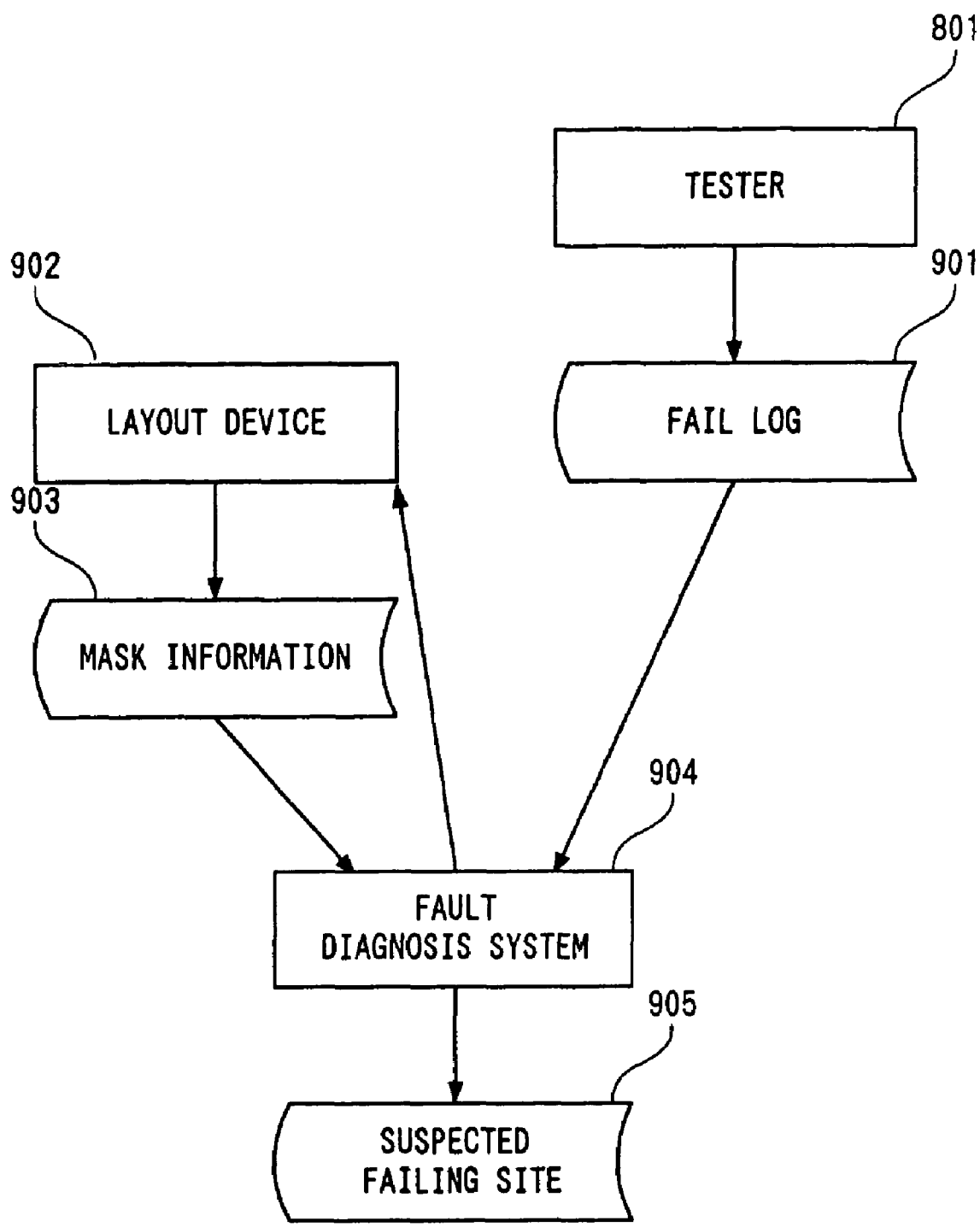
FIG. 32 is a flow chart showing a process procedure in a failing site deduction means according to a fifteenth embodiment of the present invention.
Figure 33:
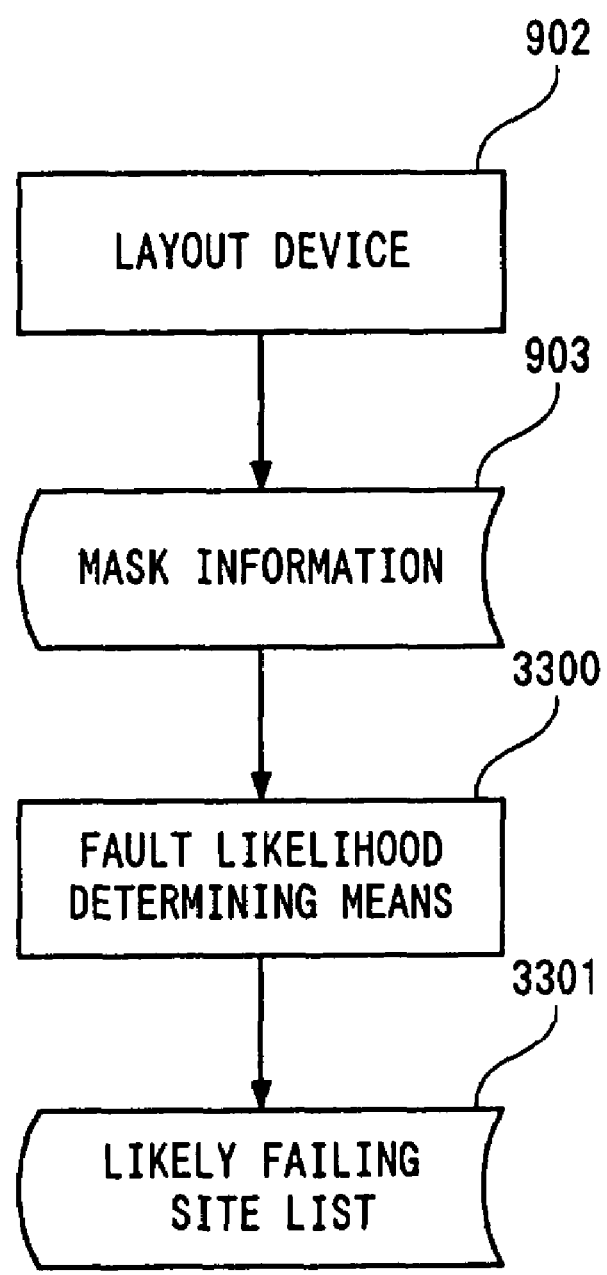
FIG. 33 is a flow chart showing a process procedure for outputting sites where a fault is likely to occur according to the fifteenth embodiment of the present invention.

FIGS. 32 and 33 shows a fifteenth embodiment of the present invention. Wires may actually be close to each other on a mask layout diagram though they appear to be mutually apart from each other on a circuit netlist as shown in FIGS. 12 and 13. That is, if a wire 2 in FIG. 12 corresponds to a wire A in FIG. 13 and a wire 4 in FIG. 12 corresponds to a wire B in FIG. 13, the wires 2 and 4 appear to be relatively apart from each other but in FIG. 13, the wires A and B are adjacent to each other. If crosses on the wires 2 and 4 in FIG. 12 are assumed to be suspected failing sites, these faults are apparently irrelevant to each other on FIG. 12 but since the masks are close to each other on FIG. 13, these faults can be assumed to be relevant to each other; they are, for example, wiring short circuits. In this manner, the relevancy between faults, which is not clear on the circuit netlist, may be evident on the actual physical mask layout. Physical components on the actual mask layout must be taken into account for actual faults.

Although conventional fault diagnosis systems perform detection for faults using only a circuit netlist and a simulator, the fault detecting method according to the present invention carries out the process also using layout information on the mask and wiring layout. FIG. 32 shows a flow chart according to the present invention. A fail log 901 output from a tester 801 and mask information 903 including wire types such as the VDD power line and the normal signal line as well as layout coordinate values which information is obtained from a layout device 902 are input to a fault diagnosis system 904 to deduction and output suspected failing sites (905). The fault diagnosis system 904 sorts out suspected failing sites and then sends information to the layout device 902 to obtain required wire types and layout coordinate values.

Alternatively, in addition to the identification of failing sites, the mask information 903 including wire types and layout coordinate values which information is obtained from the layout device 902 is used as an input to determine the likelihood of the faults (3300) in order to output a list 3301 of types of likely faults and likely failing sites, as shown in FIG. 33.

Next, the identification of suspected failing sites by the fault diagnosis system 904 will be described in detail. The present invention eliminates the disadvantage that if a fail log of rejected samples varies depending on evaluation conditions in the tester and this variation is not taken into account, the number of suspected failing sites may increase depending on the evaluation conditions in the fail log in use, thereby requiring a large amount of time to deduction failing sites. The present invention also eliminates the disadvantage that if the physical positional relationship among the sorted-out suspected failing sites on the layout is not taken into consideration and if many fault sources are present as a result of the identification, then it is difficult to automatically deduction actual physical failing sites, thereby forcing an operator to view relevant portions of the mask layout diagram to guess failing sites.

Figure 34:
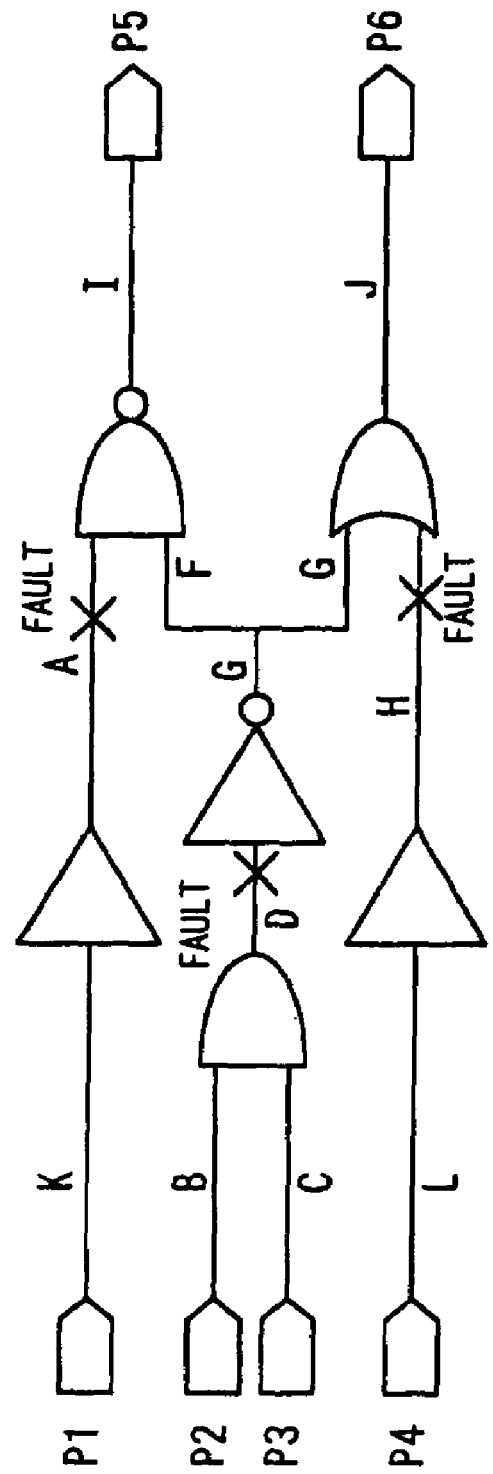
FIG. 34 is a logic circuit diagram illustrating a semiconductor circuit for which test patterns are generated according to a first example of a method for sorting out a suspected failing site according to the present invention.

FIGS. 34 to 40 show first example of a method for sorting out suspected failing sites according to the present invention. In this case, the test patterns shown in FIG. 35 are used to check whether or not a single degenerative fault is present in the semiconductor integrated circuit shown in FIG. 34. In FIG. 34, P1 to P4 denote external input signal lines and P5 and P6 denote external output signal lines. At points of time 1 to 5 in FIG. 35, when the test pattern shown in the input section in the figure is input to the signal lines P1 to P4, the signal lines P5 and P6 output signals as shown by the expected values in the figure if there is no fault in the circuit.

Figure 39:
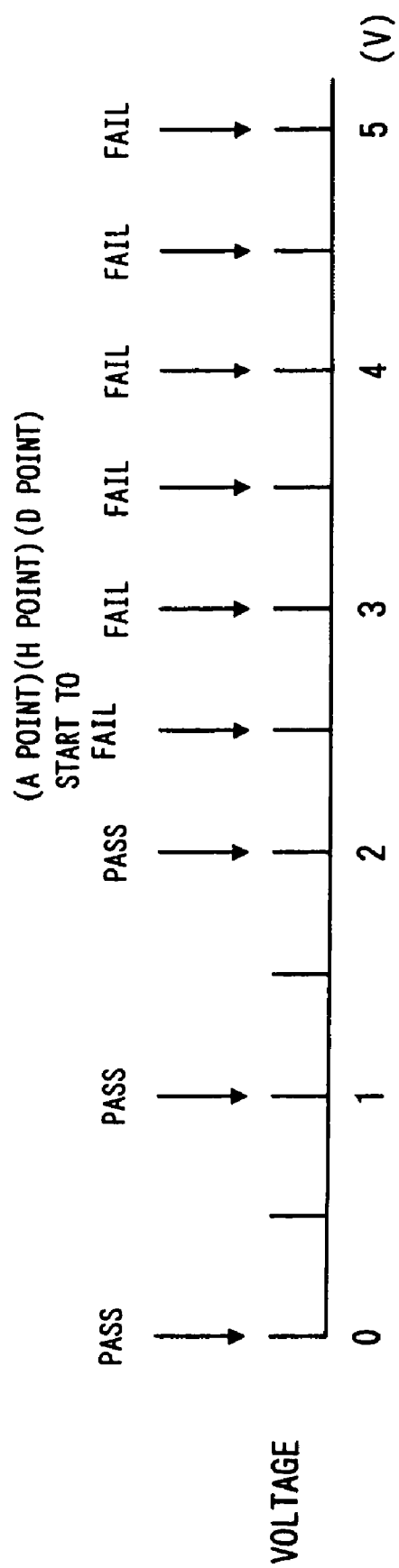
FIG. 39 is a chart showing boundary conditions for the circuit in FIG. 34.
Figure 40:
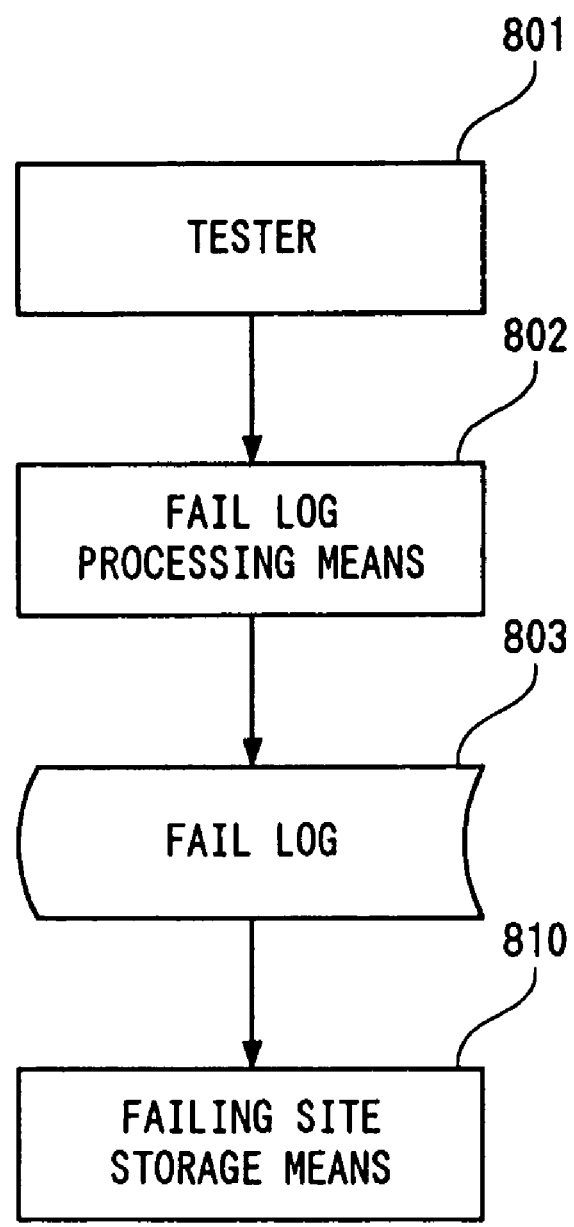
FIG. 40 is a flow chart showing a process procedure for fail log processing according to the first example of a method for sorting out a suspected failing site according to the present invention.

FIG. 36 to 38 show output results (fail logs) of evaluation of the circuit in FIG. 34 by the tester in which a fault may occur in the circuit when a measuring voltage is varied. The marked letters H and L indicate that the results differ from the expected values in FIG. 35. FIG. 39 shows variations in the operation of the semiconductor integrated circuit which occur when the measuring voltage is varied. In this figure, "Pass" indicates that no fault is present and that the circuit is operating as expected, whereas "Fail" indicates that a failing site is present in the semiconductor integrated circuit, which is not operating as expected. The output results in FIG. 39 show that when the measuring voltage is 0, 1, or 2 V, the semiconductor integrated circuit is operating correctly as shown in FIG. 35. At 2.5 V, however, a fault occurs in which a signal on the signal line A becomes 1. In this case, the results in the output fail log are as shown in FIG. 36. When the measuring voltage is raised to 3 V, a fault occurs in which the signal becomes 1 at a point H in FIG. 34, and the results in the output fail log are as shown in FIG. 37. When the measuring voltage is further raised to 3.5 V, a fault occurs in which the signal becomes 1 at a point D in FIG. 34, and the results in the output fail log are as shown in FIG. 38.

In this manner, when the measuring voltage is changed, the failing sites change and increase to change the output results (the fail log). In this case, since the fail log obtained at a voltage of 3 or 3.5 V arises from a plurality of failing sites, if this fail log is used with the current system, a large amount of time may be required to deduction the failing sites, resulting in incorrect identification. On the other hand, at 2.5 V, corresponding to a boundary condition under which a failing site appears in the fail log in FIG. 39, only the effect of one fault at the point A in FIG. 2 appears in the fail log, so that the failing sites can be easily sorted out using the current system. During the process, the tester 801 varies the measuring conditions, and a fail log processing means 802 detects the boundary condition to output the current fail log 803, which is passed to a failing site storage means 810. The measuring conditions may include temperature, frequency, and the like in addition to voltage.

The failing sites stored in the failing site storage means 810 in this manner are used to provide the test patterns used in the detection, expected values are set only for the failing sites identified by the tester, and fault simulation is carried out to deduction suspected failing sites to output faults that have affected more failing sites, as final suspected ones.

Figure 41:
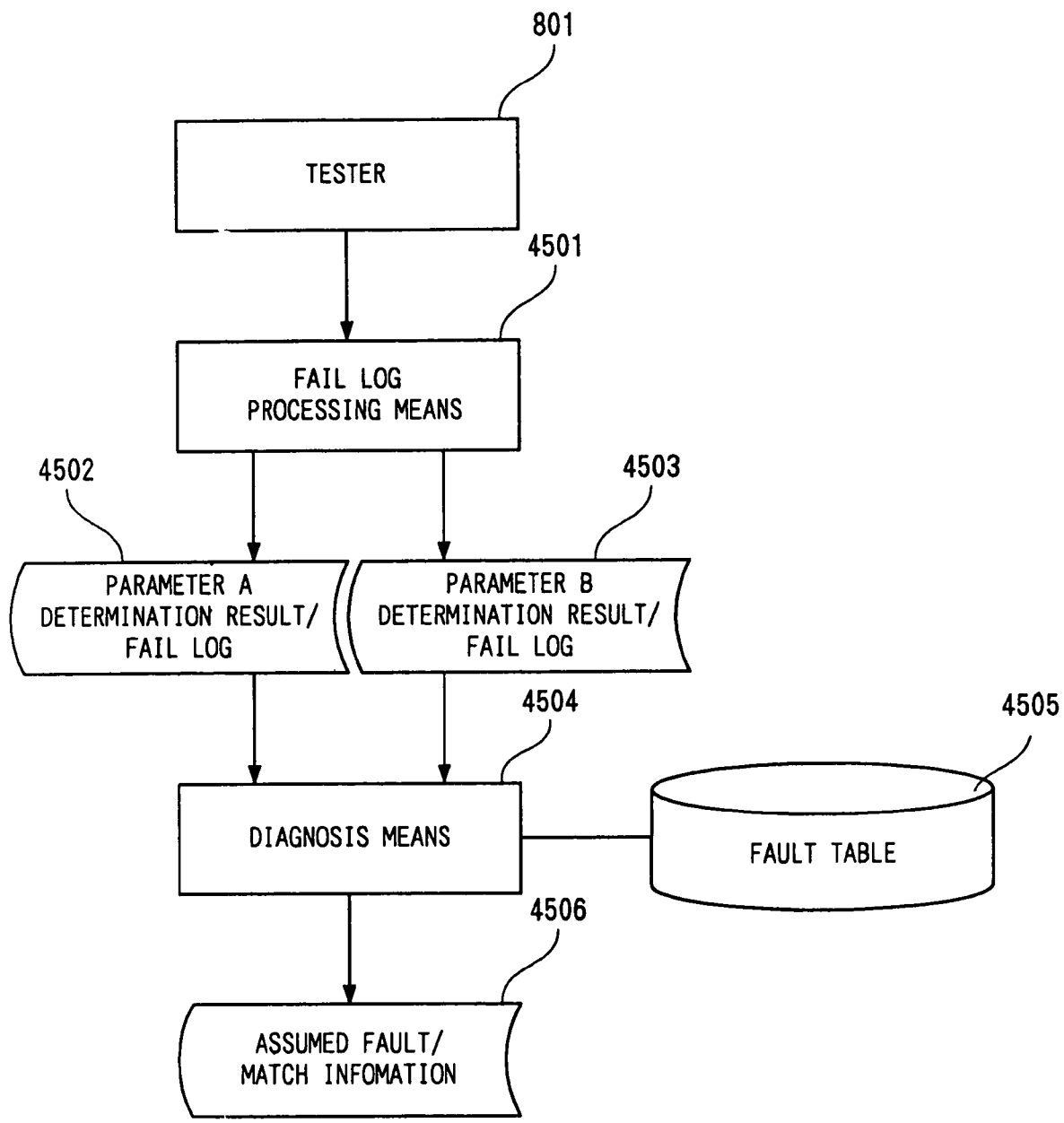
FIG. 41 is a flow chart of a second example of a method for sorting out a suspected failing site according to the present invention.

FIGS. 41 and 42 show a second example of identification of suspected failing sites by the above described fault diagnosis system 904. Various faults occur in a semiconductor integrated circuit, and fail logs output as a result of tester measurements thus have a certain tendency. If, for example, the fail log does not vary despite variations in frequency, a fault independent of frequency, for example, a degenerative fault is guessed. On the contrary, if the fail log varies when the frequency is varied, a fault dependent on frequency, for example, crosstalk is guessed. On the other hand, if the fault depends on the measuring conditions, a plurality of parameters may affect it. In this case, the fault is assumed to depend on these parameters. If a fault results from, for example, a minor current leakage, it affects both measured voltage and temperature parameters. Accordingly, the possibility of minor leakage can be estimated by checking fail logs obtained at different measuring conditions. If an identical fail log is obtained with a plurality of parameters, an identical failing site is assumed to be detected.

The approach described with reference to FIGS. 41 and 42 uses a likely-fault table such as that shown in FIG. 42. References A and B in FIG. 42 denote measuring parameters such as voltage. In FIG. 42, "A" indicates that the fail log depends on the parameter A. "!A" indicates that the fail log is independent of the parameter A. If, for example, the parameter A corresponds to voltage and the parameter B corresponds to frequency, then "A&!B" denotes an α fault that depends on voltage but is independent of frequency.

FIG. 41 shows a process flow. In this process, the measuring conditions are varied in the tester 801, which uses two parameters such as the parameters A and B, and a fail log processing means 4501 determines dependency on the measuring conditions to output the result of the determination and a fail log for the boundary condition if the result is affirmative or an invariable fail log if the result is negative. The result of the determination and a fail log 4502 for the parameter A and the result of the determination and a fail log 4503 for the parameter B which are all output by the fail log processing means 4501 are used as an input, and diagnosis means 4504 compares these determination results and fail logs together to guess the types of likely faults from a fault table 4505 in the form shown in FIG. 42 (4506), the fault table being held as a database. If the fail logs are exactly the same, information indicating the match is also output. In this manner, the type and site of the fault can be guessed from the fail log information from the tester.

Figure 43:
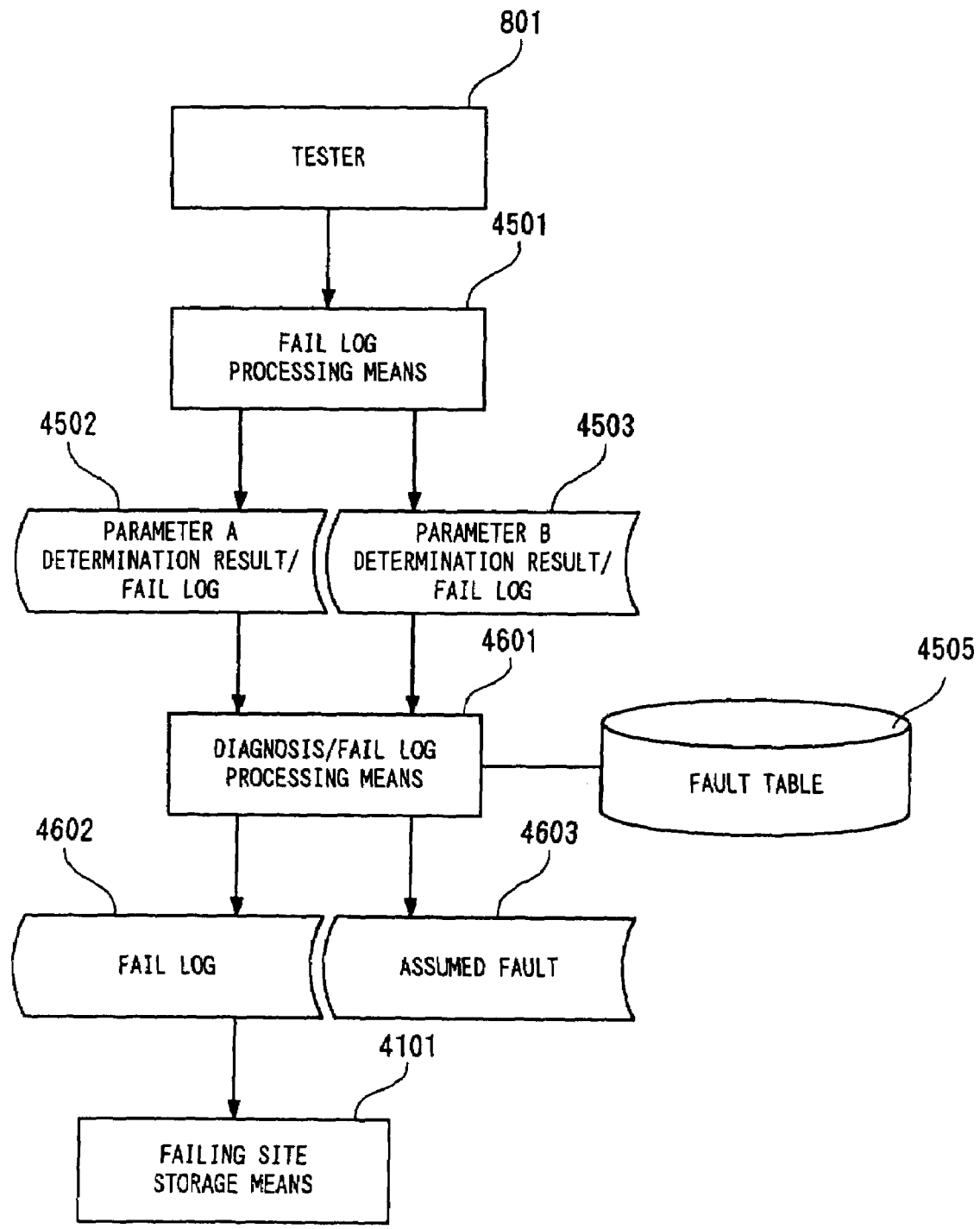
FIG. 43 is a flow chart of a third example of a method for sorting out a suspected failing site according to the present invention.

FIG. 43 shows a third example of a method by which the fault diagnosis system 904 sorts out suspected failing sites. Again, a method with two parameters such as the parameters A and B will be explained. The measuring conditions are varied in the tester 801, and the fail log processing means 4501 determines dependency on the measuring conditions to output the result of the determination and a fail log for the boundary condition if the result is affirmative or an invariable fail log if the result is negative. The result of the determination and the fail log 4502 for the parameter A and the result of the determination and the fail log 4503 for the parameter B which are all output by the fail log processing means 4501 are used as an input, and a diagnosis/fail log processing means 4601 compares these determination results and fail logs together to guess the types of likely faults from the fault table 4505 in the form shown in FIG. 42 (4603), the fault table being held as a database. The diagnosis/fail log processing means 4601 comprehensively analyzes the fail logs 4502 and 4503 to extract duplicates from the fail logs to generate a fail log 4602 and passes it to a failing site storage means 4101 of the fault diagnosis system to deduction suspected failing sites. Thus, since the required information is obtained from the fail logs to guess the types and sites of faults in order to comprehensively analyze the fail logs for a plurality of measuring conditions, the fault diagnosis system can subsequently efficiently deduction suspected failing sites and improve diagnosis accuracy.

Figure 44:
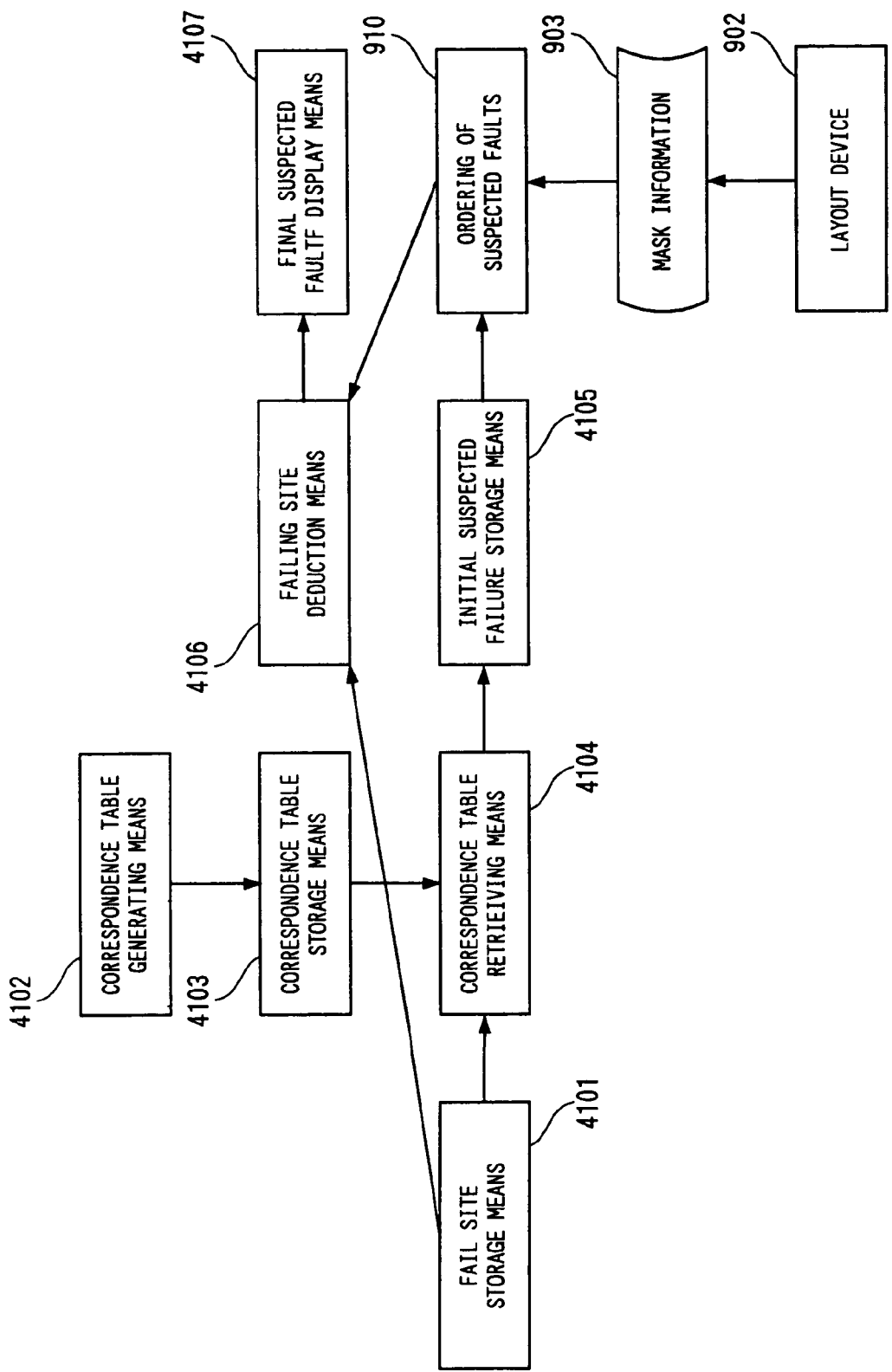
FIG. 44 is a flow chart showing a process procedure executed by a failing site deduction means according to a sixteenth embodiment of the present invention.
Figure 45:
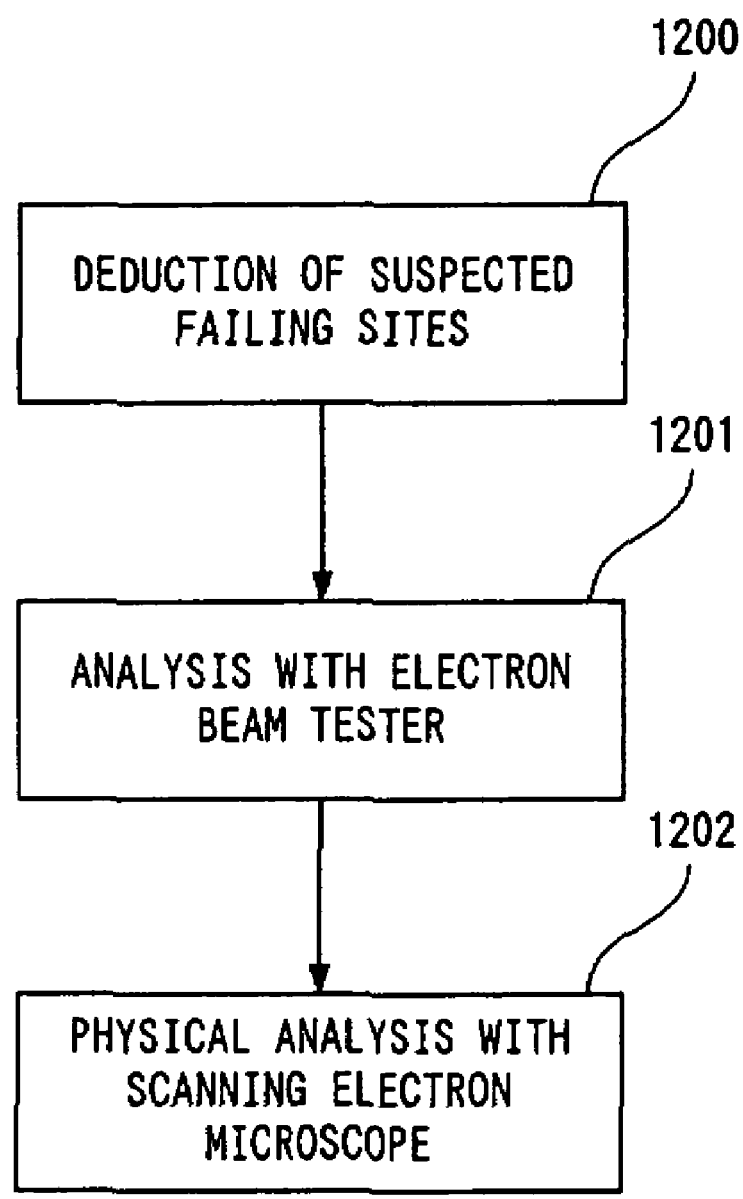
FIG. 45 is a flow chart showing a process procedure for a general fault analysis according to the sixteenth embodiment of the present invention.
Figure 46:
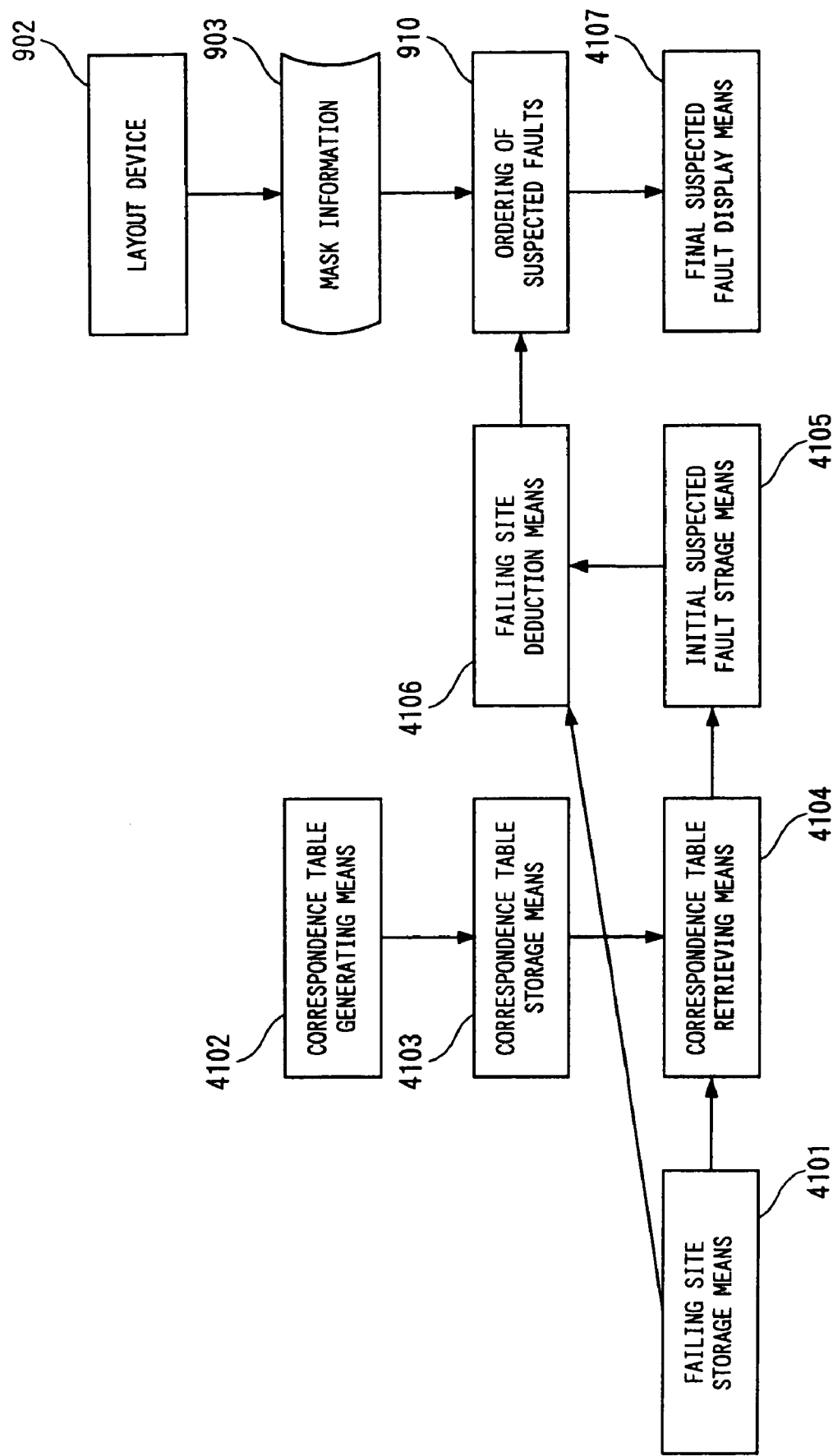
FIG. 46 is a diagram showing a variation of the process procedure in FIG. 44.

FIGS. 44 to 46 shows a sixteenth embodiment of the present invention. The sixteenth embodiment uses fail logs for the process as in the fifteenth embodiment, but further uses mask information obtained from a layout device for physically laying out the mask layout and wiring, to guess and order suspected faults to deduction failing sites. FIG. 44 shows a procedure for this process.

In FIG. 44, reference numeral 4101 denotes the failing site storage means, reference numeral 4102 denotes a correspondence table generating means, reference numeral 4103 denotes a correspondence table storage means, reference numeral 4104 denotes a correspondence table retrieving means, reference numeral 4105 denotes an initial suspected fault storage means, reference numeral 4106 denotes a failing site deduction means, and reference numeral 4107 denotes a final suspected fault display means.

First, the fail site storage means 4101 stores failing sites identified by the tester when detecting the target semiconductor integrated circuit but for which an output signal from the circuit does not match a corresponding expected value to be obtained when no fault is present. On the other hand, fault simulation is carried out in which the test pattern used for the detection is used to determine whether or not the target fault can be detected in the circuit. The correspondence table generating means 4102 generates a correspondence table indicating failing sites in the circuit and a point of time and an external pin at which each of the faults is first detected, and the correspondence table storage means 4103 stores the created correspondence table. The retrieval means 4104 checks the individual failing sites stored in the failing site storage means 4101 against the contents of the correspondence table stored in the correspondence table storage means 4103 to extract all corresponding faults from the correspondence table as initial suspected faults, and the initial suspected fault storage means 4105 stores information on the initial suspected faults. The failing site deduction means 4106 provides the initial suspected faults with the test patterns used in the detection, sets expected values only for the failing sites identified by the tester, and carries out fault simulation to deduction suspected failing sites to output faults that have affected more failing sites, as final suspected ones. The final suspected fault display means 4107 then displays the final suspected faults, corresponding to the results of diagnosis by the failing site deduction means 4106.

In this case, the suspected faults stored in the initial suspected fault storage means 4105 are ordered with their likelihood based on the mask information 903 obtained from the layout device 902 (910). The ordering method is as described above. Fault simulation is further executed to select from the fault sites (4106) to thereby select from the suspected failing sites. Although the fault simulation is time-consuming, the initial suspected faults obtained from the correspondence table retrieving means 4104 are ordered so that the most suspected faults are first processed, thereby enabling actual failing sites to be promptly sorted out while generally avoiding time-consuming useless fault simulation.

As shown in FIG. 45, an electron beam tester 1201 or a scanning electron microscope 1202 is typically used to deduction physical sites of faults and check fault conditions after the fault diagnosis system has been used for a netlist to deduction suspected failing sites (1200). These operations, however, are time-consuming. Accordingly, the most suspected failing sites must first be processed.

Thus, according to the present method, an attempt is made to deduction suspected failing sites, and even if a plurality of suspected failing sites remain finally, since they have been ordered with their likelihood, the most suspected fault is first processed in accordance with this order. Consequently, an electron beam tester or a scanning electron microscope can be effectively used.

FIG. 46 shows a variation of the embodiment shown in FIG. 44. In this case, the failing site deduction means 4106 orders the suspected faults with their likelihood based on information obtained from the layout device, thereby providing effects similar to those in the embodiment in FIG. 44. In addition, since the layout information 902 is used as in the above described fifteenth embodiment, the types of the sorted-out suspected faults can be guessed.

Figure 47:
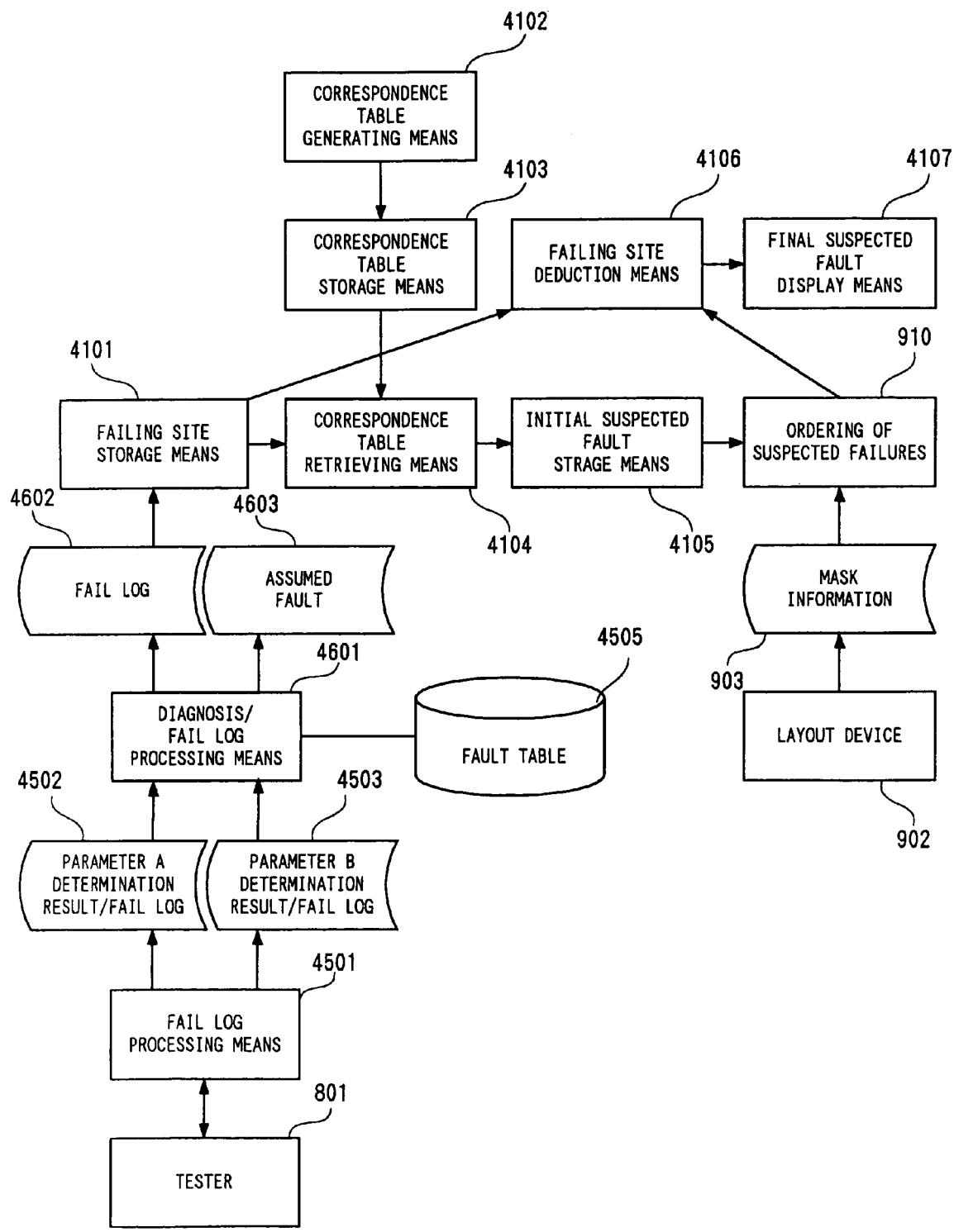
FIG. 47 is a flow chart showing another example of a process procedure executed by the fault site deduction means according to the present invention.

FIG. 47 is a diagram useful in explaining a method for detecting faults in the semiconductor integrated circuit, the method sorting out failing sites by varying the measuring conditions in the tester to comprehensively analyze fail logs for the plurality of measuring conditions and adding physical layout information on the mask or wiring layout to guess and order suspected faults with their likelihood. In this case, failing sites are sorted out by varying the measuring conditions in the tester 801 to comprehensively analyze fail logs for the plurality of measuring conditions (4501) and adding physical layout information 903 on the mask or wiring layout obtained from the layout means 902, to guess and order suspected faults with their likelihood (910). Fail log information 4602 is stored in the failing site storage means 4101. The suspected fault ordering means 910 uses the suspected faults in the initial suspected fault storage means 4105 as an input to order them, and the failing sites are passed to the failing site deduction means 106 in accordance with this order. As described above, by comprehensively analyzing the fail logs for the plurality of measuring conditions set in the tester 801 and adding the physical information on the mask layout or wiring, the types of the suspected faults can be efficiently guessed and the failing sites can be efficiently sorted out.

Thus, by processing fail logs, used as an input for fault diagnosis, to reduce faults to be diagnosed, the time required for the deduction can be reduced. The fail log information can also be used to guess the types of faults. Additionally, by adding physical information on the mask or wiring layout, the types of suspected faults can be efficiently guessed and failing sites can be accurately sorted out.

We claim:

1. A computer-implemented layout method for a semiconductor integrated circuit, comprising:
    omitting from a fault list faults that are difficult to detect; and
    performing by a computer mask layout and wiring of a semiconductor integrated circuit based on a remaining part of the fault list.

2. The computer-implemented layout method for a semiconductor integrated circuit according to claim 1, wherein the fault list contains data on a likelihood of occurrence of each fault.

3. The computer-implemented layout method for a semiconductor integrated circuit according to claim 2, wherein the mask layout and the wiring are performed for the semiconductor integrated circuit using a fault list ordered such that each fault is listed according to its likelihood of occurrence.

4. The computer-implemented layout method for a semiconductor integrated circuit according to claim 3, wherein the faults are ordered or weighted according to their likelihood of occurrence based on mask information obtained from a layout device for laying out the semiconductor integrated circuit.

5. The computer-implemented layout method for a semiconductor integrated circuit according to claim 3, further comprising:
    obtaining mask information from a layout device for laying out the semiconductor integrated circuit,
    calculating a density of a mask pattern based on the mask information obtained from the layout device, and
    ordering or weighting the faults according to their likelihood of occurrence depending on the density of the mask pattern.

6. The computer-implemented layout method for a semiconductor integrated circuit according to claim 3, wherein the faults are ordered or weighted according to their likelihood of occurrence using a database for reliability based on records of past use of cells or functional blocks of the semiconductor integrated circuit.

7. The computer-implemented layout method for a semiconductor integrated circuit according to claim 2, wherein the faults are weighted according to their likelihood of occurrence to determine a fault coverage for the mask layout and wiring for the semiconductor integrated circuit.

8. The computer-implemented layout method for a semiconductor integrated circuit according to claim 7, wherein the faults are ordered according to their likelihood of occurrence and are weighted in accordance with this ordering.

9. The computer-implemented layout method for a semiconductor integrated circuit according to claim 8, further comprising:
    calculating a fault coverage that is obtained when detecting each fault,
    deleting from the fault list in an order of unlikelihood of occurrence faults that are not required to achieve a specified fault coverage, and
    performing a fault detecting process for the remaining faults.

10. The computer-implemented layout method for a semiconductor integrated circuit according to claim 8, further comprising:
    calculating the fault coverage while carrying out a process for each fault detection in accordance with the ordering, and
    stopping the process once a specified fault coverage has been reached.

* * * * *